US012660020B2

(12) United States Patent
Naik et al.

(10) Patent No.: US 12,660,020 B2
(45) Date of Patent: Jun. 16, 2026

(54) GROUP ADDRESSED FRAME RECEPTION FOR NON-ACCESS POINT (NON-AP) MULTI-LINK DEVICES (MLDS)

(71) Applicant: QUALCOMM Incorporated, San Diego, CA (US)

(72) Inventors: Gaurang Naik, San Diego, CA (US); Abhishek Pramod Patil, San Diego, CA (US); Alfred Asterjadhi, San Diego, CA (US); George Cherian, San Diego, CA (US); Sai Yiu Duncan Ho, San Diego, CA (US); Yanjun Sun, San Diego, CA (US); Abdel Karim Ajami, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 17/454,022

(22) Filed: Nov. 8, 2021

(65) Prior Publication Data

US 2023/0144291 A1     May 11, 2023

(51) Int. Cl.
*H04W 48/10*          (2009.01)
*H04W 48/16*          (2009.01)
(Continued)

(52) U.S. Cl.
CPC ........... *H04W 76/15* (2018.02); *H04W 48/10* (2013.01); *H04W 48/16* (2013.01);
(Continued)

(58) Field of Classification Search
CPC ..... H04W 8/22–245; H04W 28/02–26; H04W 48/02–20; H04W 72/02–569;
(Continued)

(56)                 References Cited

U.S. PATENT DOCUMENTS

2021/0212141 A1     7/2021   Chu et al.
2021/0212150 A1     7/2021   Chu et al.
(Continued)

OTHER PUBLICATIONS

"35. Extremely High Throughput (EHT), MAC Specification 35. 1 Introduction", IEEE Draft, TGBE_CL_35, IEEE-SA, Piscataway, NJ, USA, vol. 802.11be, Drafts, No. D1.2, Sep. 23, 2021, pp. 1-96, XP068185764, p. 326 section 35.3.3 p. 353-354 section 35.3.14 p. 362-365 sections 35.3.16-35.3.17, section 35.3.14.1, p. 35.
(Continued)

*Primary Examiner* — Timothy J Weidner
(74) *Attorney, Agent, or Firm* — Patterson + Sheridan, L.L.P.

(57)                  ABSTRACT

Certain aspects of the present disclosure relate to wireless communications and, more particularly, to multi-link communications. A method that may be performed by an access point (AP) multi-link device (MLD) includes establishing a plurality of links for communication with a non-AP MLD, wherein one or more non-AP MLDs, including the non-AP MLD, communicate with the AP on each link of the plurality of links and taking one or more actions designed to ensure that the non-AP MLD is able to receive a group addressed frame. The non-AP MLD is operating in an enhanced multi-link single radio (EMLSR) mode.

27 Claims, 18 Drawing Sheets

(51) Int. Cl.

| | |
|---|---|
| *H04W 74/00* | (2009.01) |
| *H04W 74/0816* | (2024.01) |
| *H04W 76/15* | (2018.01) |
| *H04W 76/25* | (2018.01) |
| *H04W 84/12* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ..... *H04W 74/002* (2013.01); *H04W 74/0816* (2013.01); *H04W 76/25* (2018.02); *H04W 84/12* (2013.01); *H04W 88/02* (2013.01); *H04W 88/08* (2013.01); *H04W 92/02* (2013.01); *H04W 92/10* (2013.01)

(58) Field of Classification Search
CPC ........... H04W 74/002–0891; H04W 76/10–50; H04W 80/02–12; H04W 84/02–16; H04W 88/02–12; H04W 92/02–04; H04W 92/10

See application file for complete search history.

(56) References Cited

U.S. PATENT DOCUMENTS

| | | | |
|---|---|---|---|
| 2021/0250963 A1* | 8/2021 | Seok | H04W 74/0816 |
| 2021/0282119 A1* | 9/2021 | Asterjadhi | H04W 76/15 |
| 2023/0109759 A1* | 4/2023 | Ratnam | H04W 76/15 |
| 2023/0110142 A1* | 4/2023 | Gan | H04W 76/15 |

OTHER PUBLICATIONS

International Search Report and Written Opinion—PCT/US2022/045800—ISA/EPO—Jan. 31, 2023.

Taiwan Search Report—TW111137989—TIPO—Mar. 25, 2026.

* cited by examiner

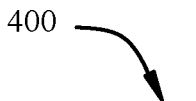
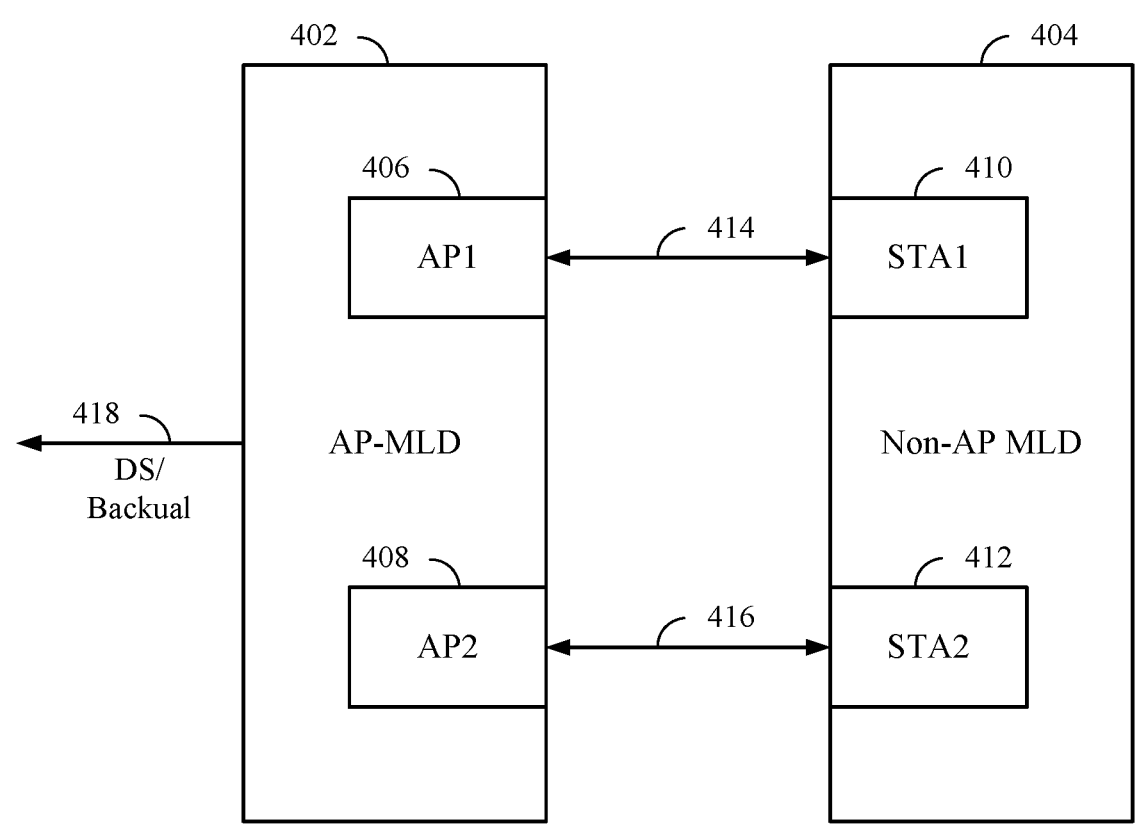
FIG. 4

1500

1505

ESTABLISH, BY AN ACCESS POINT (AP) MULTI-LINK DEVICE (MLD), A PLURALITY OF LINKS FOR COMMUNICATION WITH A NON-AP MLD, WHEREIN ONE OR MORE NON-AP MLDS, INCLUDING THE NON-AP MLD, COMMUNICATE WITH THE AP ON EACH LINK OF THE PLURALITY OF LINKS

1510

TAKE, BY THE AP MLD, ONE OR MORE ACTIONS DESIGNED TO ENSURE THAT THE NON-AP MLD IS ABLE TO RECEIVE A GROUP ADDRESSED FRAME

1600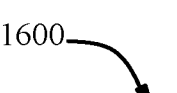

1605

ESTABLISH, BY A NON-ACCESS POINT (NON-AP) MULTI-LINK DEVICE (MLD) OPERATING IN AN ENHANCED MULTI-LINK SINGLE RADIO (EMLSR) MODE, A PLURALITY OF LINKS FOR COMMUNICATION WITH AN AP MLD, WHEREIN ONE OR MORE NON-AP MLDS, INCLUDING THE NON-AP MLD, COMMUNICATE WITH THE AP ON EACH LINK OF THE PLURALITY OF LINKS

1610

TAKE, BY THE NON-AP OPERATING IN THE EMLSR MODE, ONE OR MORE ACTIONS DESIGNED TO ENSURE THAT THE NON-AP MLD IS ABLE TO RECEIVE A GROUP ADDRESSED FRAME

FIG. 16

1700
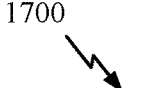
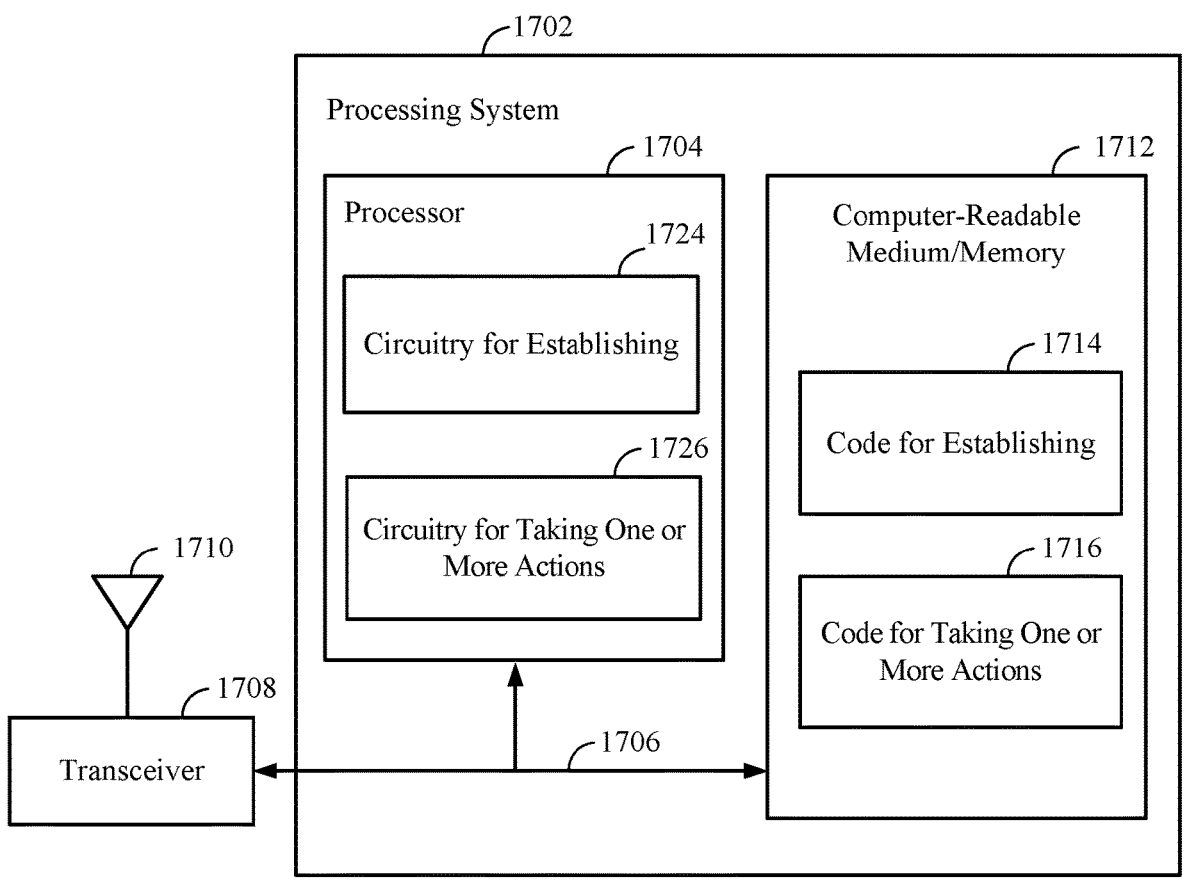
FIG. 17

1800
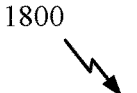
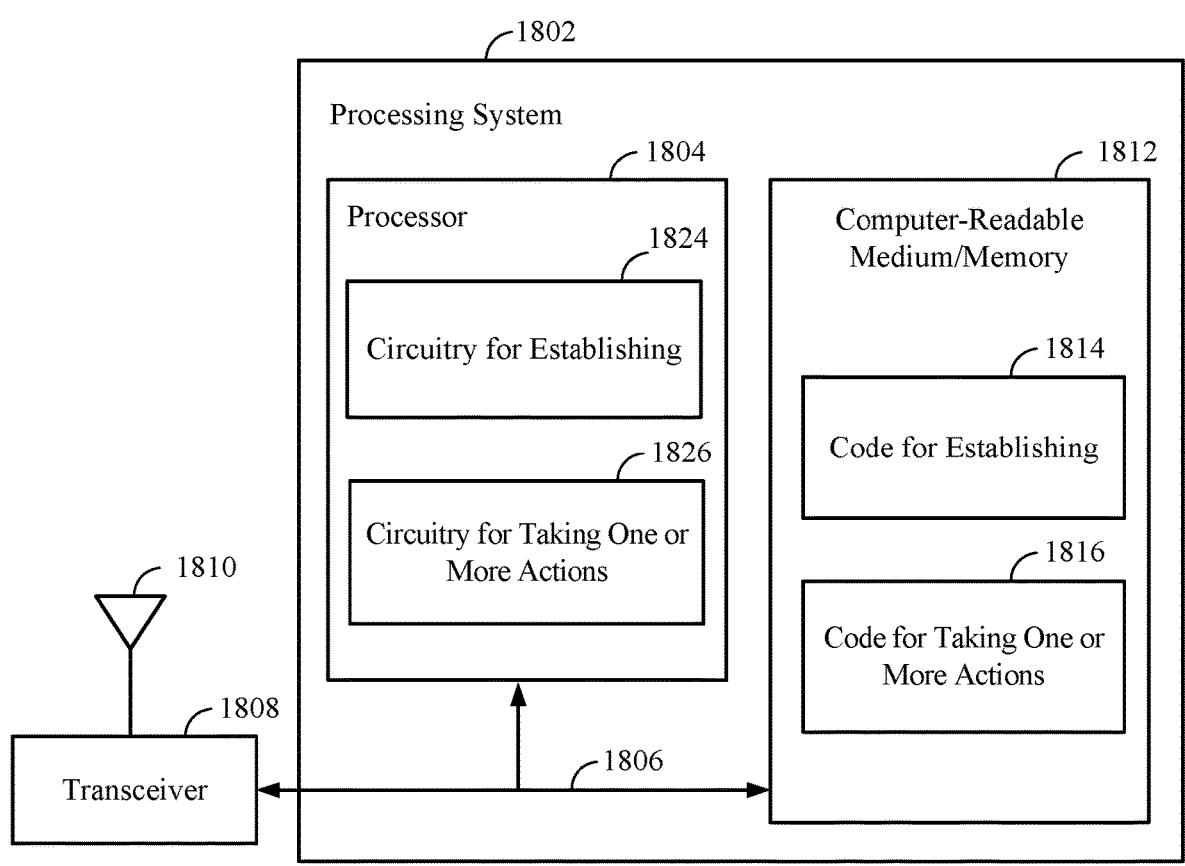
FIG. 18

GROUP ADDRESSED FRAME RECEPTION FOR NON-ACCESS POINT (NON-AP) MULTI-LINK DEVICES (MLDS)

TECHNICAL FIELD

Certain aspects of the present disclosure generally relate to wireless communications and, more particularly, to multi-link communications.

DESCRIPTION OF THE RELATED TECHNOLOGY

Wireless communications networks are widely deployed to provide various communications services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communications systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (such as tens of meters to a few hundred meters).

SUMMARY

The systems, methods and devices of this disclosure each have several innovative aspects, no single one of which is solely responsible for the desirable attributes disclosed herein. Certain aspects of the present disclosure generally relate to wireless communications and, more particularly, to techniques for link management for managing multi-link communications.

Certain aspects of the present disclosure provide a method for wireless communication at an access point (AP) multi-link device (MLD). The method generally includes establishing a plurality of links for communication with a non-AP MLD, wherein one or more non-AP MLDs, including the non-AP MLD, communicate with the AP on each link of the plurality of links and taking one or more actions designed to ensure that the non-AP MLD is able to receive a group addressed frame.

Certain aspects of the present disclosure provide a method for wireless communication performed by a non-AP MLD operating in an enhanced multi-link single radio (EMLSR) mode. The method generally includes establishing a plurality of links for communication with an AP MLD, wherein one or more non-AP MLDs, including the non-AP MLD, communicate with the AP on each link of the plurality of links and taking one or more actions designed to ensure that the non-AP MLD is able to receive a group addressed frame.

Certain aspects of the present disclosure can be implemented in an apparatus for wireless communication by an AP MLD. The apparatus generally includes a memory and a processor coupled to the memory, the processor and the memory being configured to: establish a plurality of links for communication with a non-AP MLD, wherein one or more non-AP MLDs, including the non-AP MLD, communicate with the AP on each link of the plurality of links and take one or more actions designed to ensure that the non-AP MLD is able to receive a group addressed frame.

Certain aspects of the present disclosure can be implemented in an apparatus for wireless communication by a non-AP MLD operating in an EMLSR mode. The apparatus generally includes a memory and a processor coupled to the memory, the processor and the memory being configured to: establish a plurality of links for communication with an AP MLD, wherein one or more non-AP MLDs, including the non-AP MLD, communicate with the AP on each link of the plurality of links and take one or more actions designed to ensure that the non-AP MLD is able to receive a group addressed frame.

Certain aspects of the present disclosure can be implemented in an apparatus for wireless communication by an AP MLD. The apparatus generally includes means for establishing a plurality of links for communication with a non-AP MLD, wherein one or more non-AP MLDs, including the non-AP MLD, communicate with the AP on each link of the plurality of links and means for taking one or more actions designed to ensure that the non-AP MLD is able to receive a group addressed frame.

Certain aspects of the present disclosure can be implemented in an apparatus for wireless communication by a non-AP MLD operating in an EMLSR mode. The apparatus generally includes means for establishing a plurality of links for communication with an AP MLD, wherein one or more non-AP MLDs, including the non-AP MLD, communicate with the AP on each link of the plurality of links and means for taking one or more actions designed to ensure that the non-AP MLD is able to receive a group addressed frame.

Certain aspects of the present disclosure can be implemented in a computer readable medium having computer executable code stored thereon. The computer readable medium having computer executable code stored thereon generally includes code for establishing a plurality of links for communication with a non-AP MLD, wherein one or more non-AP MLDs, including the non-AP MLD, communicate with the AP on each link of the plurality of links and code for taking one or more actions designed to ensure that the non-AP MLD is able to receive a group addressed frame.

Certain aspects of the present disclosure can be implemented in a computer readable medium having computer executable code stored thereon. The computer readable medium having computer executable code stored thereon generally includes code for establishing a plurality of links for communication with an AP MLD, wherein one or more non-AP MLDs, including the non-AP MLD, communicate with the AP on each link of the plurality of links and code for taking one or more actions designed to ensure that the non-AP MLD is able to receive a group addressed frame.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure, and the description may admit to other equally effective aspects.

FIG. 4 is a block diagram illustrating example multi-link operations between multi-link devices (MLDs), in accordance with certain aspects of the present disclosure.

FIG. 16 is a flow diagram illustrating example operations for wireless communications by a non-AP MLD, in accordance with certain aspects of the present disclosure.

FIG. 17 illustrates a communications device that may include various components configured to perform operations for the techniques disclosed herein, in accordance with aspects of the present disclosure.

FIG. 18 illustrates a communications device that may include various components configured to perform operations for the techniques disclosed herein, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
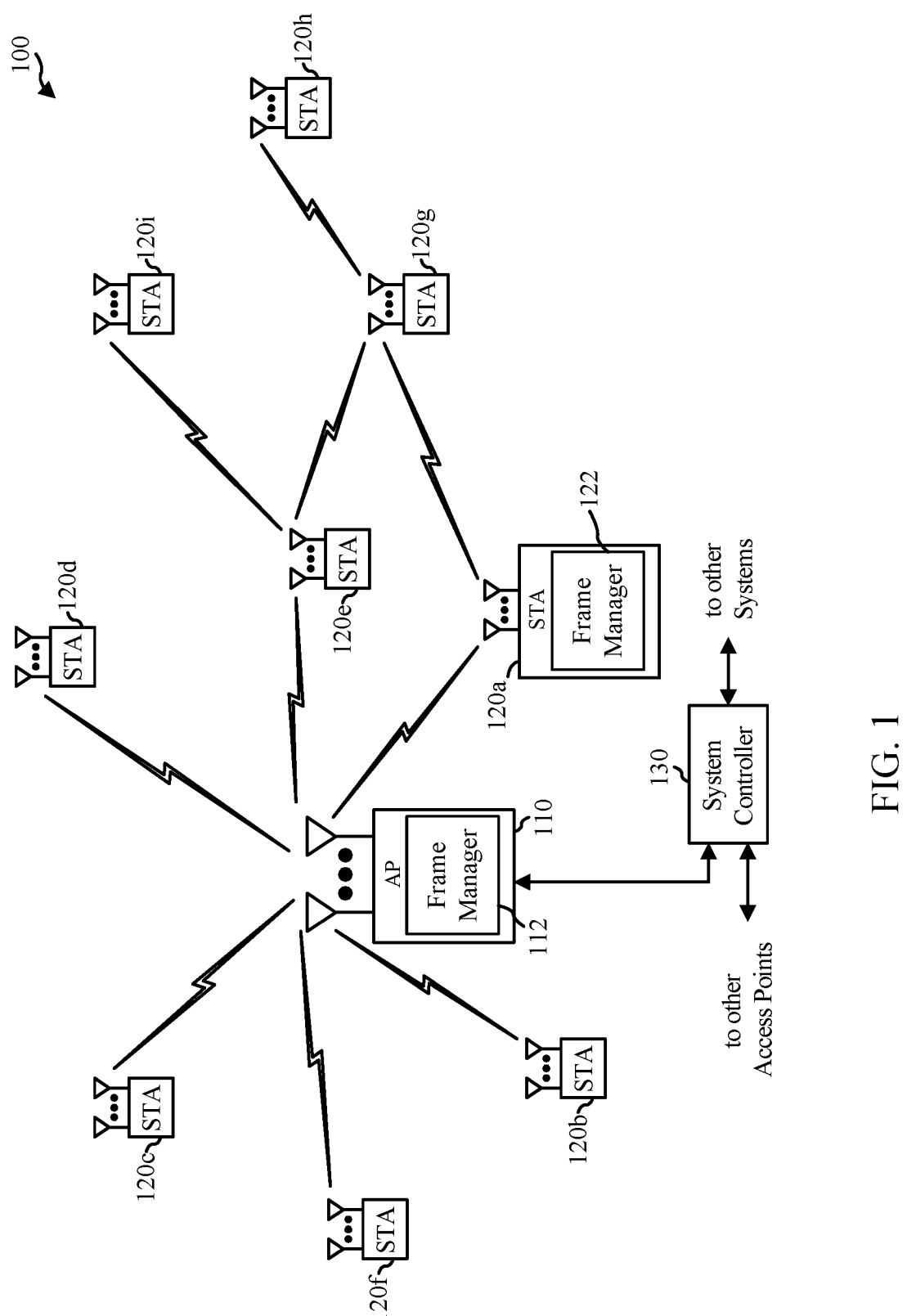
FIG. 1 is a diagram of an example wireless communications network, in accordance with certain aspects of the present disclosure.

Aspects of the present disclosure provide apparatus, methods, processing systems, and computer readable mediums for handling multi-link operations (MLOs).

In certain aspects, MLOs may be implemented with an enhanced multi-link single radio (EMLSR) architecture. An MLD operating in an EMLSR mode may only transmit and receive (e.g., transmit and receive data frames, management frames, etc.) via a single radio. Accordingly, when an MLD is transmitting and receiving frames on one EMLSR link, the MLD may not be able to transmit or receive frames on other EMLSR link(s) enabled for the MLD. In other words, the MLD may transmit and receive on only one link at a time. Because the MLD may only transmit and receive frames from the AP MLD (e.g., be in a full capability state) on one link at a time, where group addressed frames are transmitted to the MLD on one EMLSR link (e.g., a first link) while the MLD is in a full capability state on another EMLSR link (e.g., a second link), the MLD may miss receiving the group addressed frame on the first link.

Aspects herein present techniques for facilitating the reception of group addressed frame(s) at an MLD given the single-radio constraint of the MLD. According to aspects described herein, an access point (AP) MLD and/or a non-AP MLD in communication with the AP MLD may take one or more actions designed to ensure that a non-AP MLD is able to receive the group addressed frame(s).

Various aspects of the disclosure are described more fully hereinafter with reference to the accompanying drawings. This disclosure may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be implemented by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communications systems, including communications systems that are based on an orthogonal multiplexing scheme. Examples of such communications systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each subcarrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (such as implemented within or performed by) a variety of wired or wireless apparatuses (such as nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (such as a cellular phone or smart phone), a computer (such as a laptop), a tablet, a portable communications device, a portable computing device (such as a personal data assistant), an entertainment device (such as a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (such as a wide area network such as the Internet or a cellular network) via a wired or wireless communications link.

Example Wireless Communication System

FIG. 1 is a diagram illustrating an example wireless communication system 100, in accordance with certain aspects of the present disclosure. System 100 may be a multiple-input multiple-output (MIMO)/multi-link operation (MLO) system 100. As shown in FIG. 1, an access point (AP) 110 includes a frame manager 112 that may be configured to take one or more actions designed to ensure that a non-AP multi-link device (MLD) is able to receive a group addressed frame, in accordance with certain aspects of the present disclosure. The wireless station (STA) 120a includes a frame manager 122 that may be configured to take one or more actions designed to ensure that a non-AP MLD is able to receive a group addressed frame, in accordance with certain aspects of the present disclosure. In aspects, AP 110 and wireless station 120a may be MLDs as further described herein with respect to FIG. 3.

For simplicity, only one AP 110 is shown in FIG. 1. An AP is generally a fixed station that communicates with the wireless STAs and may also be referred to as a base station (BS) or some other terminology. A wireless STA may be fixed or mobile and may also be referred to as a mobile STA, a wireless device, or some other terminology. AP 110 may communicate with one or more wireless STAs 120 at any given moment on the downlink (DL) and/or uplink (UL). The DL (i.e., forward link) is the communication link from AP 110 to the wireless STAs 120, and the UL (i.e., reverse link) is the communication link from the wireless STAs 120 to AP 110. A wireless STA 120 may also communicate peer-to-peer with another wireless STA 120, for example, via a direct link such as a tunneled direct link setup (TDLS). A system controller 130 may be in communication with and provide coordination and control for the access points.

While portions of the following disclosure will describe wireless STAs 120 capable of communicating via Spatial Division Multiple Access (SDMA), for certain aspects, the wireless STAs 120 may also include some wireless STAs 120 that do not support SDMA. Thus, for such aspects, an AP 110 may be configured to communicate with both SDMA and non-SDMA wireless STAs 120. This approach may conveniently allow older versions of wireless STAs 120 ("legacy" stations) to remain deployed in an enterprise, extending their useful lifetime, while allowing newer SDMA wireless STAs 120 to be introduced as deemed appropriate.

System 100 employs multiple transmit and multiple receive antennas for data transmission on the DL and UL. AP 110 is equipped with $N_{ap}$ antennas and represents the multiple-input (MI) for DL transmissions and the multiple-output (MO) for UL transmissions. A set of K selected wireless stations 120 collectively represents the multiple-output for DL transmissions and the multiple-input for UL transmissions. For pure SDMA, it is desired to have $N_{ap} \geq K \geq 1$ if the data symbol streams for the K wireless STAs are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected wireless STA transmits user-specific data to and/or receives user-specific data from the access point. In general, each selected wireless STA may be equipped with one or multiple antennas (i.e., $N_{sta} \geq 1$). The K selected wireless STAs can have the same or different number of antennas.

System 100 may be a time division duplex (TDD) system or a frequency division duplex (FDD) system. For a TDD system, the DL and UL share the same frequency band. For an FDD system, the DL and UL use different frequency bands. System 100 may also utilize a single carrier or multiple carriers for transmission. Each wireless STA may be equipped with a single antenna or multiple antennas. System 100 may also be a TDMA system if wireless STAs 120 share the same frequency channel by dividing transmission/reception into different time slots, each time slot being assigned to a different wireless STA 120.

Figure 2:
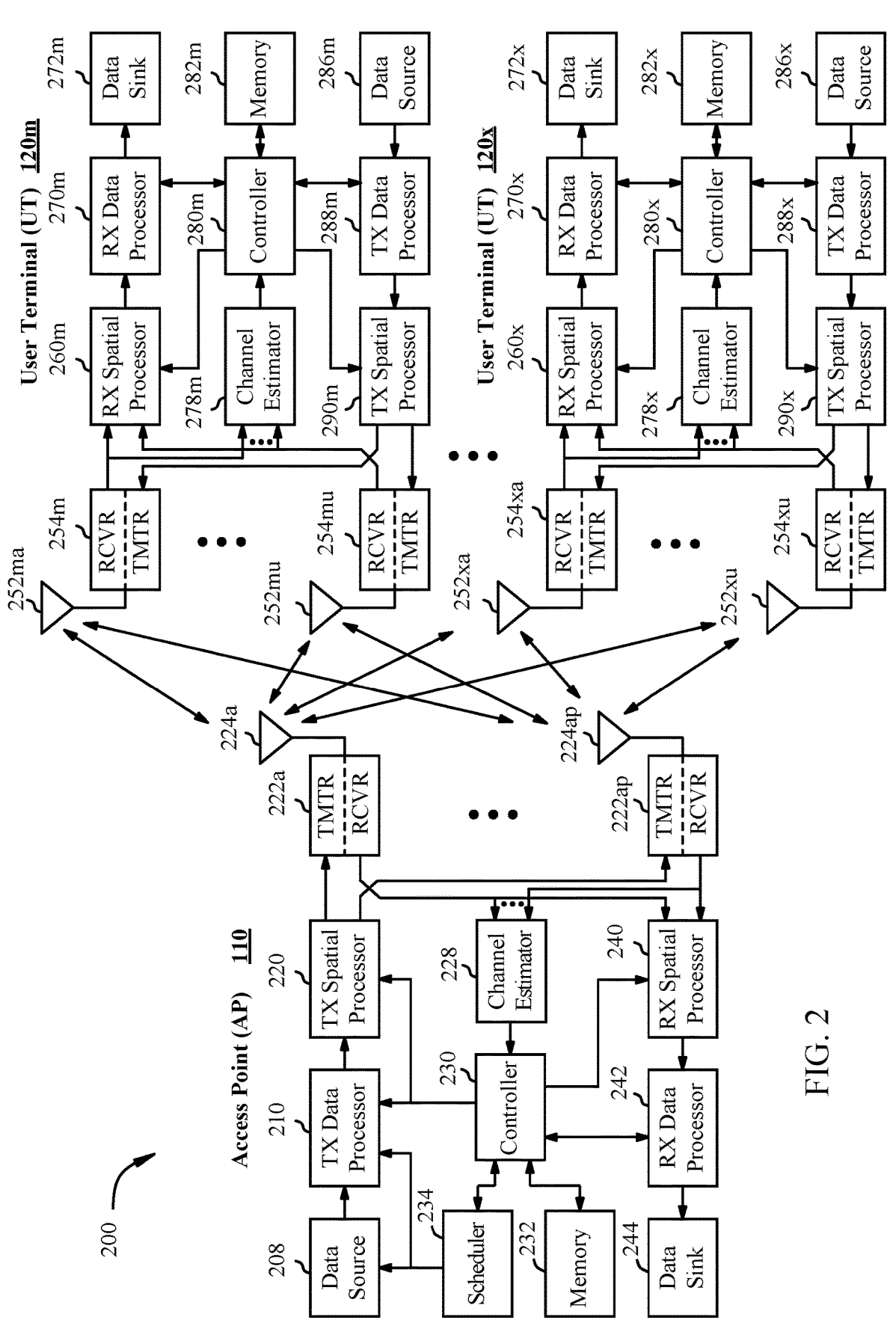
FIG. 2 is a block diagram of an example access point (AP) and example wireless stations (STAs), in accordance with certain aspects of the present disclosure.

FIG. 2 illustrates a block diagram of AP 110 and two wireless STAs 120m and 120x in a MIMO/MLO system, such as system 100, in accordance with certain aspects of the present disclosure. In certain aspects, AP 110 and/or wireless STAs 120m and 120x may perform various techniques to ensure that a non-AP MLD is able to receive a group addressed frame. For example, AP 110 and/or wireless STAs 120m and 120x may include a respective frame manager as described herein with respect to FIG. 1.

AP 110 is equipped with $N_{ap}$ antennas 224a through 224t. Wireless STA 120m is equipped with $N_{sta,m}$ antennas 252ma through 252mu, and wireless STA 120x is equipped with $N_{sta,x}$ antennas 252xa through 252xu. AP 110 is a transmitting entity for the DL and a receiving entity for the UL. Each wireless STA 120 is a transmitting entity for the UL and a receiving entity for the DL. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "DL" denotes the downlink, the subscript "UL" denotes the uplink, $N_{UL}$ wireless STAs are selected for simultaneous transmission on the uplink, $N_{DL}$ wireless STAs are selected for simultaneous transmission on the downlink. $N_{UL}$ may or may not be equal to $N_{DL}$, and $N_{UL}$ and $N_{DL}$ may be static values or can change for each scheduling interval. The beam-steering or some other spatial processing technique may be used at the access point and wireless station.

On the UL, at each wireless STA 120 selected for UL transmission, a transmit (TX) data processor 288 receives traffic data from a data source 286 and control data from a controller 280. TX data processor 288 processes (e.g., encodes, interleaves, and modulates) the traffic data for the wireless station based on the coding and modulation schemes associated with the rate selected for the wireless STA and provides a data symbol stream. A TX spatial processor 290 performs spatial processing on the data symbol stream and provides $N_{sta,m}$ transmit symbol streams for the $N_{sta,m}$ antennas. Each transceiver (TMTR) 254 receives and processes (e.g., converts to analog, amplifies, filters, and frequency upconverts) a respective transmit symbol stream to generate an uplink signal. $N_{sta,m}$ transceivers 254 provide $N_{sta,m}$ UL signals for transmission from $N_{sta,m}$ antennas 252 to AP 110.

$N_{UL}$ wireless STAs may be scheduled for simultaneous transmission on the uplink. Each of these wireless STAs performs spatial processing on its data symbol stream and transmits its set of transmit symbol streams on the UL to AP 110.

At AP 110, $N_{ap}$ antennas 224a through 224ap receive the UL signals from all $N_{UL}$ wireless STAs transmitting on the UL. Each antenna 224 provides a received signal to a respective transceiver (RCVR) 222. Each transceiver 222 performs processing complementary to that performed by transceiver 254 and provides a received symbol stream. A receive (RX) spatial processor 240 performs receiver spatial processing on the $N_{ap}$ received symbol streams from $N_{ap}$ transceiver 222 and provides $N_{UL}$ recovered UL data symbol streams. The receiver spatial processing is performed in accordance with the channel correlation matrix inversion (CCMI), minimum mean square error (MMSE), soft interference cancellation (SIC), or some other technique. Each recovered UL data symbol stream is an estimate of a data symbol stream transmitted by a respective wireless station. An RX data processor 242 processes (e.g., demodulates, deinterleaves, and decodes) each recovered uplink data symbol stream in accordance with the rate used for that stream to obtain decoded data. The decoded data for each wireless STA may be provided to a data sink 244 for storage and/or a controller 230 for further processing.

On the DL, at AP 110, a TX data processor 210 receives traffic data from a data source 208 for $N_{DL}$ wireless stations scheduled for downlink transmission, control data from a controller 230, and possibly other data from a scheduler 234. The various types of data may be sent on different transport channels. TX data processor 210 processes (e.g., encodes, interleaves, and modulates) the traffic data for each wireless station based on the rate selected for that wireless station. TX data processor 210 provides $N_{DL}$ DL data symbol streams for the $N_{DL}$ wireless stations. A TX spatial processor 220 performs spatial processing (such as a precoding or beamforming, as described in the present disclosure) on the $N_{DL}$ DL data symbol streams, and provides $N_{ap}$ transmit symbol streams for the $N_{ap}$ antennas. Each transceiver 222 receives and processes a respective transmit symbol stream to generate a DL signal. $N_{ap}$ transceivers 222 providing $N_{ap}$ DL signals for transmission from $N_{ap}$ antennas 224 to the wireless STAs.

At each wireless STA 120, $N_{sta,m}$ antennas 252 receive the $N_{ap}$ DL signals from access point 110. Each transceiver 254 processes a received signal from an associated antenna 252 and provides a received symbol stream. An RX spatial processor 260 performs receiver spatial processing on $N_{sta,m}$ received symbol streams from $N_{sta,m}$ transceiver 254 and provides a recovered DL data symbol stream for the wireless station. The receiver spatial processing is performed in accordance with the CCMI, MMSE or some other technique. An RX data processor 270 processes (e.g., demodulates, deinterleaves and decodes) the recovered DL data symbol stream to obtain decoded data for the wireless station.

At each wireless STA 120, a channel estimator 278 estimates the DL channel response and provides DL channel estimates, which may include channel gain estimates, SNR estimates, noise variance and so on. Similarly, a channel estimator 228 estimates the UL channel response and provides UL channel estimates. Controller 280 for each wireless STA typically derives the spatial filter matrix for the wireless station based on the downlink channel response matrix $H_{dn,m}$ for that wireless station. Controller 230 derives the spatial filter matrix for the AP based on the effective UL channel response matrix $H_{up,eff}$. Controller 280 for each wireless STA may send feedback information (e.g., the downlink and/or uplink eigenvectors, eigenvalues, SNR estimates, and so on) to the AP. Controllers 230 and 280 also control the operation of various processing units at AP 110 and wireless STA 120, respectively.

Figure 3:
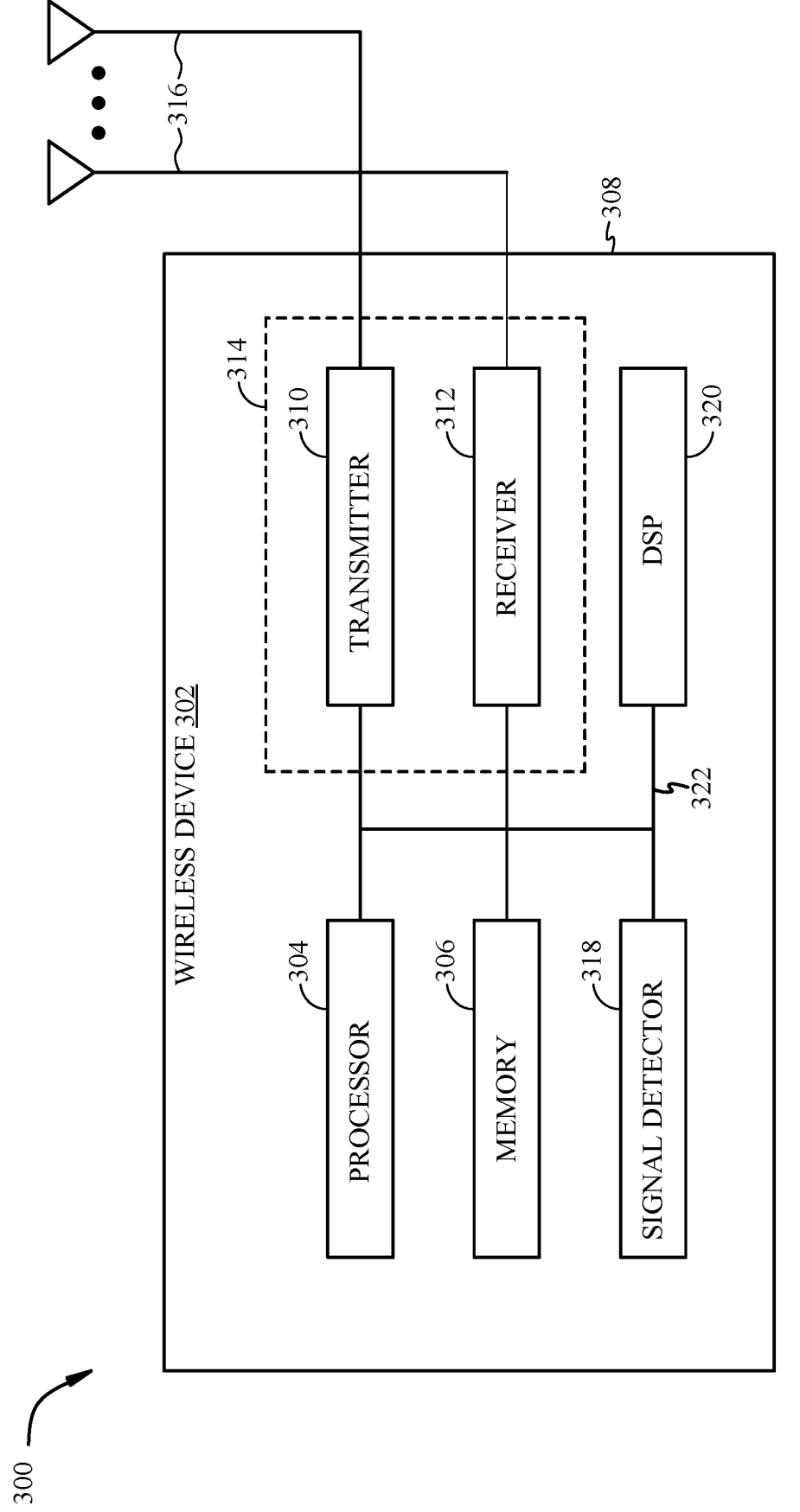
FIG. 3 illustrates an example wireless device, in accordance with certain aspects of the present disclosure.

FIG. 3 illustrates various components that may be utilized in a wireless device 302 that may be employed within system 100, in accordance with certain aspects of the present disclosure. Wireless device 302 is an example of a device that may be configured to implement the various methods described herein. Wireless device 302 may be an AP 110 or a user terminal.

Wireless device 302 may include a processor 304 which controls operation of wireless device 302. Processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

Wireless device 302 may also include a housing 308 that may include a transmitter 310 and a receiver 312 to allow transmission and reception of data between the wireless device 302 and a remote location. Transmitter 310 and receiver 312 may be combined into a transceiver 314. A single or a plurality of transmit antennas 316 may be attached to the housing 308 and electrically coupled to the transceiver 314. Wireless device 302 may also include (not shown) multiple transmitters, multiple receivers, and multiple transceivers.

Wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. Wireless device 302 may also include a digital signal processor (DSP) 320 for use in processing signals.

The various components of wireless device 302 may be coupled together by a bus system 322, which may include a power bus, a control signal bus, and a status signal bus in addition to a data bus.

Certain aspects of the present disclosure are directed to apparatus and techniques for implementing multi-link communications. For example, certain aspects provide techniques for managing data flows for across multiple links by an MLD. Multiple bands may be implemented for wireless devices. For example, a wireless device may be able to support at least one of a 2.4 GHz band, a 5 GHz band or a 6 GHz band and operate over more than one link spread over these bands. With multi-link communications, data flows may be transmitted across multiple wireless links which may be associated with different bands.

In certain wireless communication networks (e.g., 802.11be networks), an MLD may be a wireless communication device with multiple affiliated APs 110 or STAs 120. The MLD may have a single MAC service access point (SAP) to a logical link control (LLC) layer. The MLD may also have a MAC address that uniquely identifies the MLD management entity. An MLD may support various MLOs. In aspects, MLO may include multi-band aggregation, where two or more channels at different bands (e.g., 2.4, 5, and 6 gigahertz (GHz) bands) are combined to achieve higher transmission rates. In aspects, the 6 GHz band may include a frequency range of 5.925-7.125 GHz. For example, a single frame may be split and transmitted simultaneously through the different channels at the different bands, reducing the frames transmission time or facilitating transmission of larger aggregated frames. MLO may include multi-band and multi-channel full duplex communications, which is achieved through transmitting and receiving on different channels (in the same or different bands) at the same time. MLO may include data and control plane separation on to different channels (in the same or different bands). In certain aspects, MLO may be implemented with a multi-link single radio (MLSR) architecture, where the multiple affiliated Aps 110 or STAs 120 of an MLD may be logical devices under a single radio. In certain aspects, MLO may be implemented with an enhanced multi-link single radio (EMLSR) architecture.

FIG. 4 is a block diagram 400 illustrating example MLOs between MLDs, in accordance with certain aspects of the present disclosure. As shown, an AP MLD 402 may communicate with a non-AP MLD 404 via multi-link communications, such as multi-band aggregation. The AP MLD 402 may also be in communication with other systems (e.g., a distribution system (DS) such as a local area network and/or a wide area network) via an interface 418, such as a backhaul interface. The AP MLD 402 may include at least two STA entities 406, 408 (sometimes referred to as STA instances and also referred to herein simply as STAs) that may communicate with associated STA entities 410, 412 of the non-AP MLD 404. An STA entity (or instance) of an AP MLD is generally an AP (which may be referred to as an AP-STA or an STA serving as an AP), and an STA entity of a non-AP MLD is generally a non-AP STA (which may be referred to simply as a STA). MLDs may use MLOs, such as multi-link aggregation (MLA) (which includes packet level aggregation), where MAC protocol data units (MP-DUs) from a same traffic ID (TID) can be sent via two or more links 414, 416.

In aspects, each of the STA entities 406, 408 may communicate on separate bands (e.g., 2.4, 5, and 6 GHz bands), and similarly, each of the STA entities 410, 412 may communicate on separate bands (2.4, 5, and 6 GHz bands). For example, the STA entities 406, 410 may communicate with each other on a first link 414 via a first band (e.g., 5 GHz band), and the STA entities 408, 412 may communicate with each other on a second link 416 via a second band (e.g., 6 GHz band). The aggregated links 414, 416 may enable desirable throughputs and latencies between the AP MLD 402 and the non-AP MLD 404. In aspects, the STA entities (406, 408 or 410, 412) of an MLD may be implemented as separate devices or RF transceiver chips of the MLD, or the STA entities may be integrated into the same device or RF transceiver chip. In certain aspects, a link may refer to a physical path having one traversal of the wireless medium (WM) that is usable to transfer various packets, messages, or frames (such as MAC service data units (MSDUs)) between two STAs.

Example Group Addressed Frame Reception for
Enhanced Multi-Link Single Radio (EMLSR)
Non-Access Point (Non-AP) Multi-Link Devices
(MLDs)

Multi-link operations (MLOs) allow an access point (AP) multi-link devices (MLDs) and a non-AP MLD to transmit and receive data from a same traffic flow over multiple radio interfaces, as described in detail above. In certain aspects, MLOs may be implemented with a multi-link single radio (MLSR) architecture, where the multiple affiliated AP or non-AP MLDs may be logical devices under a single radio. In certain other aspects, MLOs may be implemented with an enhanced multi-link single radio (EMLSR) architecture. An MLD operating in the MLSR or the EMLSR mode may only transmit and receive (e.g., transmit and receive data frames, management frames, etc.) via a single radio.

A non-AP MLD may operate in an EMLSR mode on a specified set of enabled links. The non-AP MLD operating in the EMLSR mode may be referred to herein as an EMLSR non-AP MLD or a non-AP MLD for simplicity. The specified set of links enabled for the EMLSR mode may be referred to as EMLSR links.

The non-AP MLD may be able to listen on the EMLSR links by having its affiliated STA(s) corresponding to those links in an awake state. In some cases, the non-AP MLD may be able to listen on two or more EMLSR links simultaneously. While performing the listening operation, the non-AP MLD may be said to be a 1×1 listen state. In the 1×1 listen state, the non-AP MLD may perform various functions, such as a clear channel assessment (CCA) to appraise the radio frequency (RF) medium. The CCA may involve listening for RF transmission at physical (PHY) layer. Further, in the 1×1 listen state, the non-AP MLD may receive an initial control frame of a frame exchange sequence that is initiated by an AP that is operating on one of the EMLSR links and may also be capable of receiving other types of frames within a subset of physical layer (PHY) protocol data unit (PPDU) types and PHY rates supported in the full capability mode.

Transmission of an initial control frame from an AP MLD to the non-AP MLD may be used to initiate a frame exchange sequence with the non-AP MLD on one of the EMLSR links enabled for the non-AP MLD. After receiving the initial control frame, the non-AP MLD may enter into a transmission (TX)/reception (RX) state (e.g., a 2×2 TX/RX state) for transmitting and receiving frames (e.g., with the AP) on the link in which the initial control frame was received. The term "2×2 TX/RX state" may be interchangeably used herein with a "full capability state." In this context, "full capability" generally means that the non-AP can receive any PPDU type sent at any supported rate, and all medium access control MAC frames without the restrictions applied in the 1×1 Listen state. When transmitting and receiving frames on the link in which the initial control frame was received, the non-AP MLD may not transmit or receive on other EMLSR link(s) enabled for the non-AP MLD. In other words, the non-AP MLD may transmit and receive on only one link at a time. The non-AP MLD may switch back to the listening operation (e.g., switch back to a 1×1 listen state) following completion of the frame exchange sequence with the AP.

In some cases, the non-AP MLD may initiate a frame exchange sequence with the AP. The frame exchange sequence may be initiated by the non-AP MLD on any one of the EMLSR links enabled for the non-AP MLD, at any time. Relatively few or no constraints may be placed on the first frame of the frame exchange sequence when initiated by the non-AP MLD.

In some cases, while the non-AP MLD is in the 2×2 TX/RX state on a first link, one or more frames addressed for the non-AP MLD may be transmitted in a different link, e.g., a second link. The frame(s) transmitted to the non-AP MLD on the second link may be group addressed frame(s). In certain aspects, a group addressed frame is part of a group addressed (multicast/broadcast) frame communication. In certain embodiments, a group addressed frame transmitted on an EMLSR link is addressed to one or more non-AP MLDs which have this EMLSR link as a link for group addressed frame reception. In other words, this EMLSR link may be an anchor link selected by the one or more non-AP MLDs addressed in the group addressed frames.

In some cases, a non-AP MLD may be capable of receiving a group addressed frame from the AP MLD while in a 1×1 listen state. Accordingly, the non-AP MLD may receive the group addressed frame at a different time than when engaging in a frame exchange sequence; thus, the non-AP MLD may adhere to its single-radio constraint while also not missing any group addressed frame(s) transmitted to the non-AP MLD.

However, in some other cases, a non-AP MLD may not be capable of receiving a group addressed frame from the AP MLD while in a 1×1 listen state. In such cases, reception of the group addressed frame on an EMLSR link may require the non-AP MLD to switch to a 2×2 TX/RX state on that EMLSR link. Because the non-AP MLD may only transmit and receive frames from the AP MLD (e.g., be in a 2×2 TX/RX state) on one link at a time, where group addressed frames are transmitted to the non-AP MLD on one EMLSR link (e.g., a first link) while the non-AP MLD is in a 2×2 TX/RX state on another EMLSR link (e.g., a second link), the non-AP MLD may miss receiving the group addressed frame on the first link.

Accordingly, aspects herein present techniques for facilitating the reception of group addressed frame(s) at a non-AP MLD taking into account the single-radio constraint of the non-AP MLD. The AP MLD or non-AP MLD may take one or more actions designed to ensure that the non-AP MLD is able to receive group addressed frame(s). Examples of actions taken by the AP MLD are described in more detail below with respect to FIGS. 5-9. Examples of actions taken by the non-AP MLD may be described in more detail below with respect to FIGS. 10-14.

Figure 5:
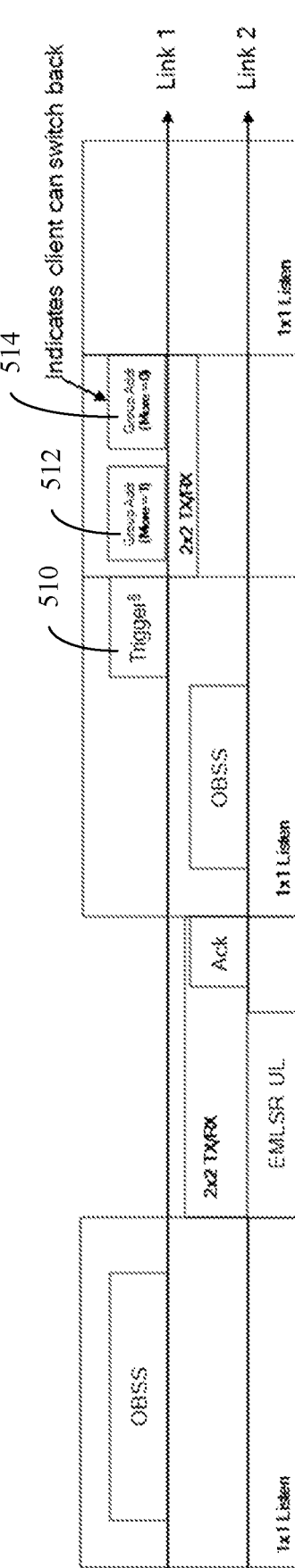
FIG. 5 is an example transmission timeline illustrating a trigger frame being transmitted prior to transmission of group addressed frames, in accordance with certain aspects of the present disclosure.

Actions taken by the AP MLD may include, but is not limited to, (1) altering a transmission time of group addressed frame(s), (2) protecting group addressed frame(s) reception at the non-AP MLD, and/or (3) providing additional information to the non-AP MLD which may aid the non-AP MLD in reception of the group addressed frame(s). Actions taken by the AP MLD may also include transmitting a trigger frame preceding the transmission of a group addressed frame. The trigger frame transmitted to the non-AP MLD prior to transmission of the group addressed frame may indicate to the non-AP MLD that the non-AP MLD needs to enter into a 2×2 TX/RX state for receiving the group addressed frame FIG. 5 is an example transmission timeline 500 illustrating a trigger frame 510 being transmitted prior to transmission of group addressed frames (512 and 514), in accordance with certain aspects of the present disclosure. As shown in FIG. 5, a non-AP MLD and AP MLD may have established two links for communication, and the non-AP MLD may be toggling between two states: a 1×1 listen state and a 2×2

TX/RX state. In this example, a trigger frame may be transmitted on a first link (e.g., Link 1) before (e.g., prior in time to) the transmission of two group addressed frames to the non-AP MLD. The trigger frame may be transmitted by the AP and subsequently received by the non-AP MLD, while the non-AP MLD is in a 1×1 listen state. The trigger frame received by the non-AP MLD during the 1×1 listen state may indicate to the non-AP MLD to switch from a 1×1 listen state to a 2×2 TX/RX state for receiving the group addressed frames (e.g., on Link 1).

By using a trigger frame, the AP MLD may be able to transmit group addressed frame(s) at essentially any time while increasing the likelihood of the non-AP MLD receiving the group addressed frame(s). In the example illustrated in FIG. 5, it may be assumed that STAs are in an active mode (e.g., none of the STAs are in the basic service set (BSS) are in a power saving (PS) mode) and can receive group addressed frame(s) at any given time. These active STAs may include STAs that are affiliated with the EMLSR non-AP MLD of interest, as well as other EHT and legacy STAs in the BSS. If any of these STAs were in the PS mode, the AP would have to buffer the GA frames until the DTIM Beacon.

In some cases, the trigger frame may be a first control type frame, such as a buffer status report poll (BSRP) or a multiple user (MU)-request to send (RTS) (MU-RTS). In this case, the User Info field of the MU RTS/BSRP will, at a minimum, be addressed to the EMLSR non-AP MLD, and may also be addressed to other (in some cases, all) EMLSR non-AP MLDs to which the GA frames are destined. In some cases, the trigger frame may be a second control type frame used to indicate to all non-AP MLDs operating in an EMLSR mode in communication with the AP MLD to each enter into a 2×2 TX/RX state, on a link where the control type frame is transmitted, for receiving the group addressed frame via this link.

As mentioned, in some cases, a non-AP MLD may be capable of receiving frames from the AP MLD while in a 1×1 listen state; thus a trigger frame, such as the trigger frame 510 illustrated in FIG. 5, may not be needed prior to the transmission of a group addressed frame by the AP. However, in some other cases, a non-AP MLD may be capable of receiving only frames having a certain rate and/or PPDU type from the AP MLD while in a 1×1 listen state. In other words, a group addressed frame having a PPDU type not supported by the non-AP MLD while in the 1×1 Listen state (but possibly supported while in the 2×2 TX/RX state) may not be received by the non-AP MLD in the 1×1 listen state. Accordingly, a trigger frame may be transmitted, prior to the transmission of the group addressed frame to indicate to all non-AP MLD expected to receive the group addressed frame to switch to a 2×2 TX/RX state (e.g., on the link where the trigger frame is sent).

A group addressed frame may include a first bit indicating to a non-AP MLD receiving the group addressed frame that a subsequent group addressed frame is to be transmitted by the AP MLD or a second bit indicating to the non-AP MLD that no additional group addressed frames are to be transmitted by the AP MLD. The non-AP MLD may determine to return to a 1×1 listen state after receiving a group addressed frame with the second bit.

As shown in FIG. 5, the first group addressed frame 512 contains a More bit equal to one which indicates to the non-AP MLD that THE second group addressed frame 514 is going to be transmitted. Further, as shown in FIG. 5, the second group addressed frame 514 contains a More bit equal to zero which indicates the non-AP MLD should not expect another group addressed frame. The non-AP MLD may thus know to return to a 1×1 listen state after receiving a group addressed frame with the More bit equal to zero.

In certain aspects, the one or more actions taken by the AP MLD include transmitting group addressed frame(s) at pre-determined times. More specifically, the one or more actions taken by the AP MLD may include buffering a group addressed frame until a pre-determined time to allow a non-AP MLD enough time to enter into a TX/RX state for receiving a group addressed frame and transmitting the group addressed frame at the pre-determined time. The transmission of a group addressed frame at a pre-determined time may provide a non-AP MLD with notice of a group addressed frame to be transmitted thereby allowing the non-AP MLD to switch to a 2×2 TX/RX state prior to transmission of the group addressed frame(s).

In some cases, the pre-determined time may include a time after a transmission of a delivery traffic indication message (DTIM) beacon at a target beacon transmission time (TBTT) interval configured by the AP for a link where the group addressed frame is to be transmitted. Such a case is illustrated in the example transmission timeline 600 of FIG. 6. As used herein, a TBTT may be a regular interval where a beacon is to be transmitted by an AP, and a DTIM beacon may refer to a beacon which informs the non-AP MLD about the presence of buffered frames (e.g., multicast/broadcast, group addressed frames) at the AP.

Figure 6:
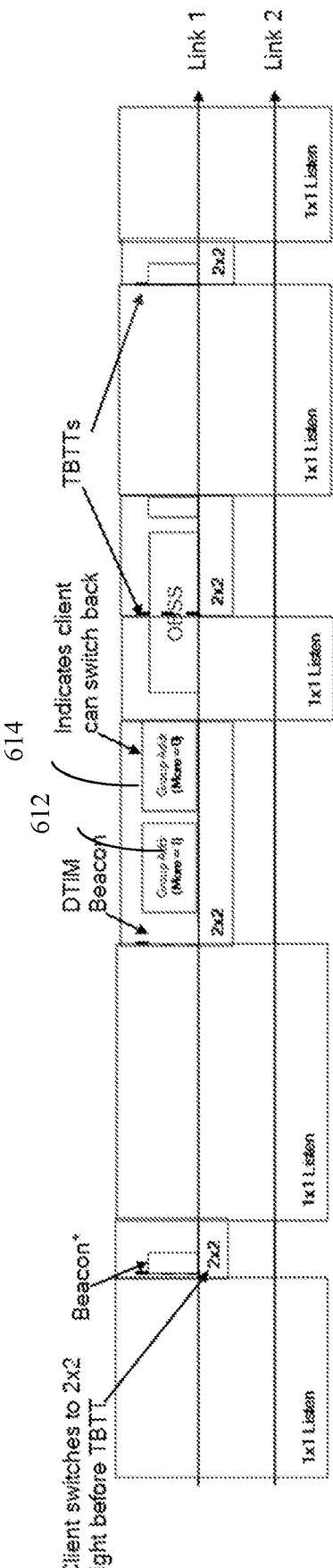
FIG. 6 is an example transmission timeline illustrating the transmission of a group addressed frame at a pre-determined time, in accordance with certain aspects of the present disclosure.

FIG. 6 is an example transmission timeline 600 illustrating the transmission of a group addressed frame at a pre-determined time, in accordance with certain aspects of the present disclosure. As shown in FIG. 6, similar to FIG. 5, a non-AP MLD and an AP MLD may have established two links for communication, and the non-AP MLD may be toggling between two states: a 1×1 listen state and a 2×2 TX/RX state. TBTTs are also configured by the AP MLD for the first link (e.g., Link 1). It may be noted that beacons, TBTTs, and/or group addressed frame transmissions 612/614 may exist on the second link, e.g., Link 2; however, these illustrations have been removed from FIG. 6 for purposes of illustration.

To aid in the transmission of group addressed frame(s) to the non-AP MLD, the AP MLD may wait to transmit group addressed frame(s) 612/614 to the non-AP MLD until after a DTIM beacon is received by the non-AP MLD at one of the TBTTs (or after one of the TBTTs) configured by the AP MLD on Link 1. As shown in FIG. 6, at the second illustrated TBTT, a DTIM beacon may be transmitted on Link 1. After transmission of the DTIM beacon, the AP MLD may be configured to transmit a first and second group addressed frame, where the first group addressed frame includes a More bit equal to one and the second group addressed frame includes a More bit equal to zero. After the second group addressed frame (e.g., having More bit=0), the non-AP MLD returns to a 1×1 listen state. By waiting to transmit the group addressed frame(s) until after the DTIM beacon is transmitted, the non-AP MLD is given sufficient time to switch to a 2×2 TX/RX state, on a link where the DTIM beacon was transmitted, before needing to receive the group addressed frames.

In some cases, a non-AP MLD may elect to receive beacons, including DTIM beacons, and group addressed frames on one or more links established between the non-AP MLD and the AP. The elected one or more links may be referred to as anchor links which are links where the non-AP MLD listens for beacons to know when to switch to a 2×2 TX/RX mode for receiving one or more group addressed frames from the AP. The non-AP MLD may indicate the elected link(s) to the AP, so that the AP MLD know which links to communicate beacons and/or group addressed frames with the non-AP MLD on. For example, in FIG. 6, the AP MLD may receive, from the non-AP MLD, a request to receive a DTIM beacon on only the first link (and not the second link). Accordingly, as shown in FIG. 6, the AP MLD transmits the DTIM beacon (e.g., triggering the non-AP MLD to switch to a 2×2 TX/RX state) on the first link in accordance with the request.

In some cases, the anchor link may be selected by the non-AP MLD with the intention of saving power. For example, the non-AP MLD may sleep through the TBTTs on all non-anchor links and listen to for beacons carrying TIM and DTIM messages by waking up only on the anchor link. The non-AP MLD may wake up on the non-anchor links to transmit Data and Control frame exchanges, but sleep through Management frames.

In some cases, the selection or recommendation of the anchor link may be announced by the AP MLD. In such cases, the AP MLD can ensure that Group Addressed frames scheduled on the anchor link may be protected (e.g., with no frame exchange sequences are scheduled with any non-AP MLD operating in the EMLSR mode during this time period) but those scheduled on any of the non-anchor links need not be protected. In some cases, the anchor link may be set up by the AP MLD as the link that is configured in the lower frequency range to ensure higher reliability and range.

It may be noted that in some cases, the beacon transmission may not always occur at a TBTT configured for a link. In some cases, a beacon may be transmitted by the AP MLD at a time after the TBTT. For example, as shown in FIG. 6, at the third TBTT configured for the first link, the medium may be busy (e.g., OBSS); thus, the beacon may be transmitted at a time later than the TBTT.

In certain aspects, the one or more actions taken by the AP MLD include actions to protect group addressed frame reception by the non-AP MLD. To protect the group addressed frame reception by the non-AP MLD, the AP, when initiating a frame exchange sequence on a first link between the AP MLD and the non-AP MLD (e.g., by transmitting a control type frame to the non-AP MLD via the first link) may, prior to initiating the frame exchange sequence first (1) determine which link is the anchor link selected by the non-AP MLD and (2) verify that the frame exchange sequence does not overlap in time with a TBTT configured by the AP MLD on the anchor link. The AP MLD may perform these steps prior to transmission of the control type frame to initiate the frame exchange sequence in cases where group addressed frames are pre-determined to be transmitted after a DTIM beacon. By first verifying that the frame sequence will not overlap with the TBTT on an anchor link, the AP MLD may ensure that the frame sequence exchange does not interfere with an ability of the non-AP MLD to receive one or more group addressed frames.

Figures 7A, 7B:
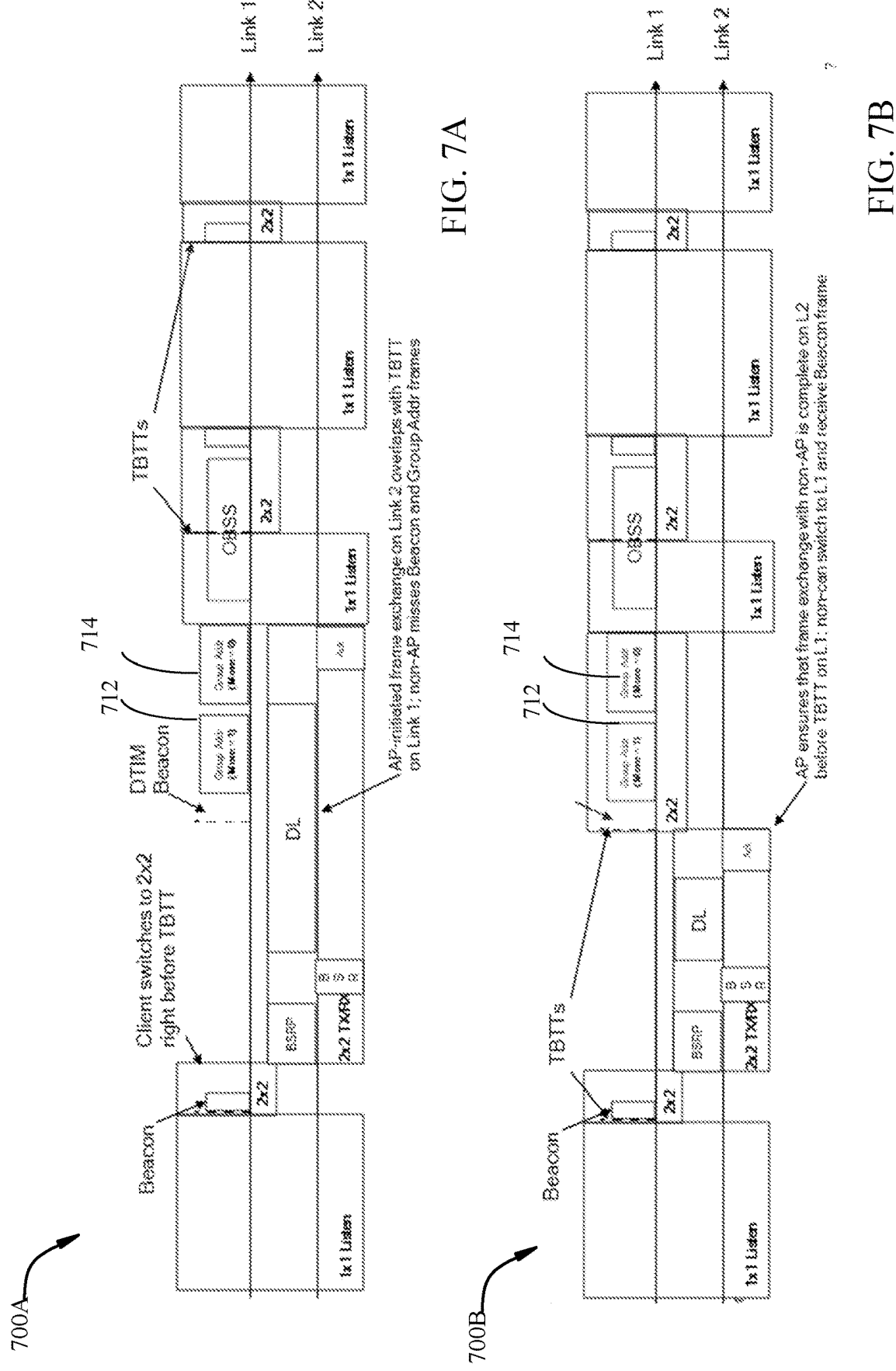
FIGS. 7A and 7B illustrate example scenarios for protecting group addressed frame reception, in accordance with certain aspects of the present disclosure.

FIGS. 7A and 7B illustrate example scenarios 700A, 700B for protecting group addressed frame reception, in accordance with certain aspects of the present disclosure. In particular, FIG. 7A illustrates an example scenario where group addressed frame reception is not protected, while FIG. 7B illustrates an example scenario where group addressed frame reception is protected.

As shown in FIG. 7A, similar to FIG. 6, an AP MLD may wait to transmit group addressed frame(s) 712/714 to a non-AP MLD until after a DTIM beacon is received by the non-AP MLD at one of the TBTTs (or after one of the TBTTs) configured by the AP MLD on Link 1. However, where the AP MLD initiates a frame exchange sequence with the non-AP MLD on a second link, e.g., Link 2, prior to transmitting the DTIM beacon on Link 1, in some cases, the frame exchange sequence may overlap in time with the DTIM beacon transmitted on Link 1. Because the non-AP MLD may only be in a 2×2 TX/RX state on one link at a time, the non-AP MLD may miss the DTIM beacon transmitted on Link 1 while in a 2×2 TX/RX state on Link 2 during the frame exchange sequence on Link 2 between the AP MLD and the non-AP MLD. Accordingly, as shown in FIG. 7A, group addressed frame reception on Link 1 may not be protected and the non-AP MLD may not be able to receive the group addressed frames on Link 1 transmitted by the AP.

To protect the group addressed frame reception on Link 1, prior to initiating the frame exchange sequence on Link 2, the AP MLD may (1) determine Link 1 is an anchor link selected by the non-AP MLD and (2) verify frame exchange sequence will not overlap in time with a subsequent (e.g., in time) TBTT on Link 1. In other words, the AP MLD may ensure that the frame exchange sequence on Link 2 with the non-AP MLD will complete on Link 2 prior in time to a TBTT on Link 1. In some cases, the non-AP MLD may take some additional 'switching delay' to transition from one state to another. For example, the AP MLD may terminate the frame exchange sequence on Link 2 to give the non-AP MLD sufficient time to switch from Link 2 to Link 1 to receive the GA frames For example, as shown in FIG. 7B, prior to initiating the frame exchange sequence on Link 2 (e.g., by transmitting the BSRP on Link 2), the AP MLD verifies the frame exchange sequence will end prior to a TBTT on Link 1 (e.g., the second TBTT shown). Because in FIG. 7B, the frame sequence is determined to end prior to the second TBTT on Link 1, the AP MLD initiates the frame exchange sequence with the non-AP MLD on Link 2. In this way, the non-AP MLD may be given sufficient time receive the DTIM beacon frame on Link 1 indicating to the non-AP MLD to switch to a 2×2 TX/RX mode on Link 1 for reception of group addressed frame(s) from the AP.

As illustrated in FIGS. 7A and 7B, in certain aspects, protection of group addressed frame reception by the non-AP MLD may be the responsibility of the AP. In some cases, the AP MLD may not have knowledge of the non-AP MLD's anchor link. Accordingly, in such cases, the AP MLD may need to protect group addressed frame reception on all links established between the AP MLD and the non-AP MLD.

In certain aspects, the one or more actions taken by the AP MLD include actions to protect group addressed frame reception by the non-AP MLD by the AP MLD (1) determining periods of beacon/group addressed frame transmission on each link established between the non-AP MLD and the AP MLD and (2) setting virtual quiet periods on the other links during those identified periods of beacon/group addressed frame transmission. Periods of beacon/group addressed frame transmission may refer to a period in time where a beacon and one or more group addressed frames may be subsequently transmitted on a same link.

In some cases, periods of beacon/group addressed frame transmission on one link may not overlap with periods of beacon/group addressed frame transmission on another link. For example, in a case where two links are established between the non-AP MLD and the AP, periods of beacon/group addressed frame transmission on a first link of the two links may not overlap in time with period of beacon/group addressed frame transmission on a second link of the two links. However, in some other cases, period of beacon/group addressed frame transmission on one link (e.g., the first link)

may overlap with periods of beacon/group addressed frame transmission on another link (e.g., the second link). In either case, an AP MLD may protect group addressed frames for a non-AP MLD using virtual quiet periods, as illustrated in FIGS. 8A and 8B.

Figures 8A, 8B:
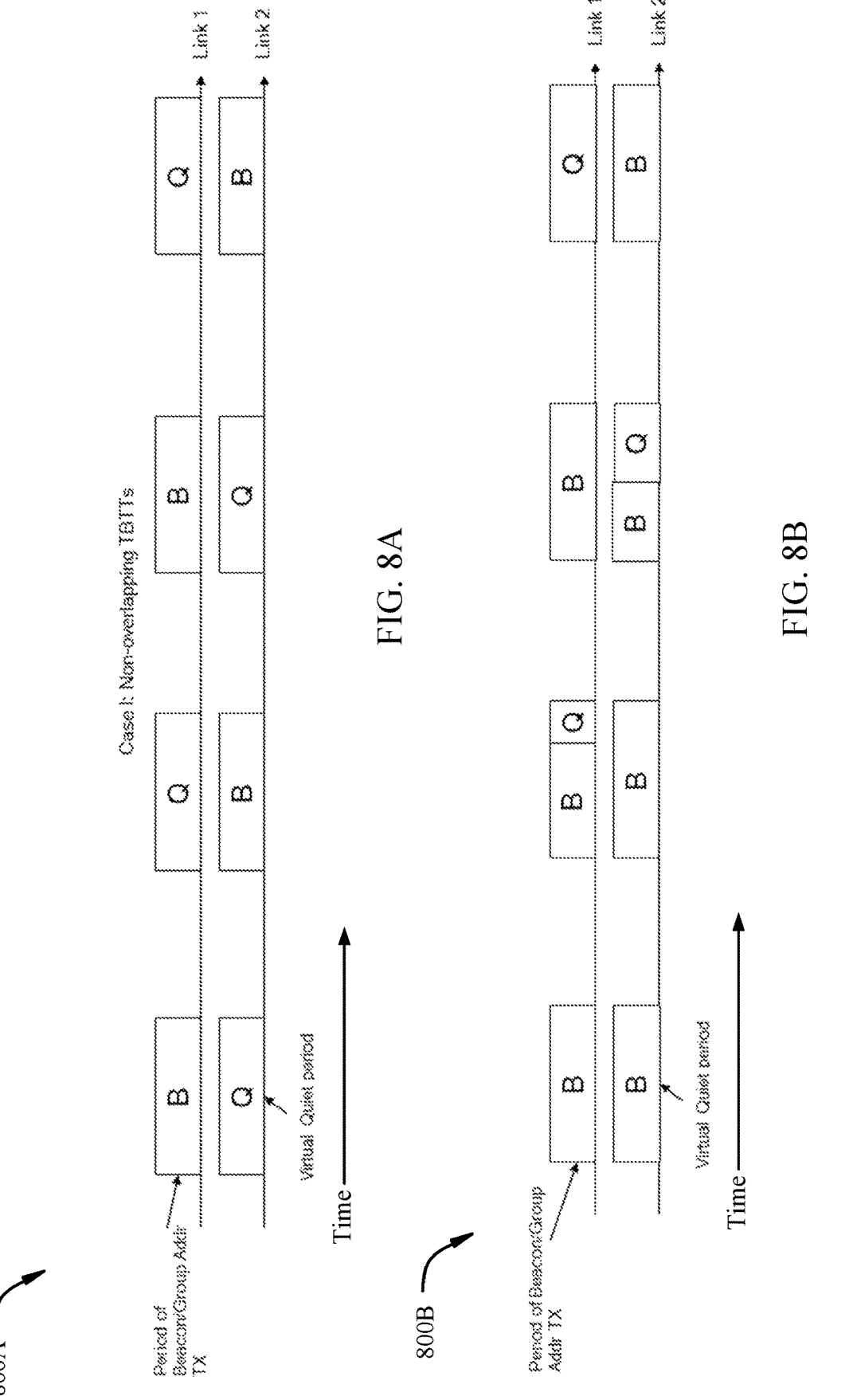
FIGS. 8A and 8B illustrate example scenarios where virtual quiet periods may be set on one or more links established between an AP and a non-AP MLD, in accordance with certain aspects of the present disclosure

FIGS. 8A and 8B illustrates example scenarios 800A, 800B where virtual quiet periods may be set on one or more links established between an AP MLD and a non-AP MLD, in accordance with certain aspects of the present disclosure.

FIG. 8A illustrates an example scenario 800A where virtual quiet periods are used to protect non-overlapping periods of beacon/group addressed frame transmission on two links. As shown in FIG. 8A, on a first link, Link 1, two periods of beacon/group addressed frame transmission may exist (e.g., denoted by "B" on Link 1 in FIG. 8A) and on a second link, Line 2, two periods of beacon/group addressed frame transmission may exist (e.g., denoted by "B" on Link 2 in FIG. 8A). An AP MLD may determine the two periods of beacon/group addressed frame transmission on Link 1 do not overlap in time with periods of beacon/group addressed frame transmission on Link 2. Accordingly, to protect group addressed frame reception by the non-AP MLD on Link 1, the AP MLD may set up two virtual quiet periods on Link 2 (e.g., denoted by "Q" on Link 2 in FIG. 8A) which overlap in time the two identified periods of beacon/group addressed frame transmission on Link 1. Additionally, to protect group addressed frame reception by the non-AP MLD on Link 2, the AP MLD may set up two virtual quiet periods on Link 1 (e.g., denoted by "Q" on Link 1 in FIG. 8A) which overlap in time the two identified periods of beacon/group addressed frame transmission on Link 2. Accordingly, a duration of a period of beacon/group addressed frame reception on Link 1 (e.g., a duration of "B") may be equal to a duration of a virtual quiet period on Link 2 (e.g., a duration of "Q"), and vice versa. The AP MLD may conservatively compute the duration a period of beacon/group addressed frame reception and/or a duration of a virtual quiet period.

During each of the virtual quiet periods set by the AP, the AP MLD may refrain from scheduling a frame exchange sequence with the non-AP MLD. In particular, during a virtual quiet period set on Link 1, the AP MLD may refrain from scheduling a frame exchange sequence with the non-AP MLD on Link 1. Further, during a virtual quiet period set on Link 2, the AP MLD may refrain from scheduling a frame exchange sequence with the non-AP MLD on Link 2. In certain aspects, the AP MLD may schedule at least one other frame exchange with another non-AP MLD or another non-AP STA when refraining from scheduling the frame exchange with the non-AP MLD on either of the links.

FIG. 8B illustrates an example scenario 800B where virtual quiet periods are used to protect overlapping and/or partially overlapping periods of beacon/group addressed frame transmission on two links. As shown in FIG. 8B, on a first link, Link 1, three identified periods of beacon/group addressed frame transmission may exist (e.g., denoted by "B" on Link 1 in FIG. 8B), and on a second link, Link 2, four identified periods of beacon/group addressed frame transmission may exist (e.g., denoted by "B" on Link 2 in FIG. 8B). An AP MLD may determine the periods of beacon/group addressed frame transmission on Link 1 overlap, at least partially in time, with the periods of beacon/group addressed frame transmission on Link 2. For example, the AP MLD may determine a first in time period of beacon/group addressed frame transmission on Link 1 overlaps completely in time with a first in time period of beacon/group addressed frame transmission on Link 2, where each of these first in time periods begin and end at a same time.

As another example, the AP MLD may determine a second in time period of beacon/group addressed frame transmission on Link 2 overlaps only partially in time with a second in time period of beacon/group addressed frame transmission on Link 1, where each of these first in time periods begin at a same time but end at a different time.

Similar to FIG. 8A, to protect group addressed frame reception by the non-AP MLD on each of Link 1 and Link 2, the AP MLD may set up virtual quiet periods on each of Link 1 and Link 2. However, in example scenario illustrated in FIG. 8A, virtual quiet periods may not be set on one link for an entire duration of a period of beacon/group addressed frame transmission on the other link. Instead, where periods of beacon/group addressed frame transmission overlap on the two links, the link with the shorter in time period of beacon/group addressed frame transmission may be quieted until the period of beacon/group addressed frame transmission on the other link (e.g., the longer period in time) is completed. For example, because the second in time period of beacon/group addressed frame transmission on Link 1 is less than the second in time period of beacon/group addressed frame transmission on Link 2, the AP MLD may set a virtual quiet period after the second in time period of beacon/group addressed frame transmission on Link 1. This virtual quiet period may continue in time until the second in time period of beacon/group addressed frame transmission on Link 2 is complete. In certain aspects, the AP MLD may schedule at least one other frame exchange sequence with another non-AP MLD or another non-AP STA during the virtual quiet period set on Link 1 (and one or more virtual quiet periods set on Link 2).

In certain aspects, an AP MLD may not be able to protect group addressed frame reception by a non-AP MLD on links established between the AP MLD and the non-AP MLD. Accordingly, the non-AP MLD may be responsible for protecting the group addressed frame reception. To assist the non-AP MLD in protecting the group addressed frame reception, in certain aspects, the one or more actions taken by the AP MLD include providing additional information to the non-AP MLD to facilitate successful group addressed frame reception at the non-AP MLD.

In some cases, group addressed frames on different links between the AP MLD and the non-AP MLD may be delivered to the non-AP MLD at different rates. The different rates of delivery for each of the different links may be attributed to different channel conditions, different bandwidths (BWs), and/or different rates of frame transmission for each of the different links. In some cases, which link has a faster rate (e.g., more frequent group addressed frame delivery) and which one has the slower rate (e.g., less frequent group addressed frame delivery) could change at any given point (or snapshot) in time.

In particular, in some cases, each group addressed frame transmitted by the AP MLD on a link established with the non-AP MLD may have a sequence number (SN) assigned to the group addressed frame. In some cases, the SN for group addressed frames may belong to a common pool of SNs. The SN of each group addressed frame may help to keep track of which link has a faster or slate rate of frame transmission. For example, a last group addressed frame transmitted on a first link may have an SN of 30 while a last group addressed frame transmitted on a second link may have an SN of 25. Based on the SN of each group addressed frame, the AP MLD may determine a rate of frame transmission for the first link is faster than a rate of frame transmission for the second link. Again, which link has a faster rate and which one has the slower rate may change over time.

A non-AP MLD may benefit from knowing the different rates of frame delivery for each of the different links the non-AP MLD shares with the AP. In particular, the non-AP MLD may use this information to determine when it may be acceptable to skip receiving a group addressed frame on one link to continue engaging in a frame exchange sequence on a second link instead. A non-AP MLD may determine it is acceptable to skip receiving the group addressed frame when a rate of frame delivery on the second link is less than a rate of frame delivery on the first link. A slower rate of frame delivery on the second link may allow the non-AP MLD to receive frames missed on the first link at a later time on the second link (e.g., the non-AP MLD may catch up on the slower link). Accordingly, the non-AP MLD may not suffer a performance loss by skipping the group addressed frames on the first link, as the non-AP MLD may receive these frames at a later time on the second link. This scenario is described in more detail with respect to FIG. 9.

Figure 9:
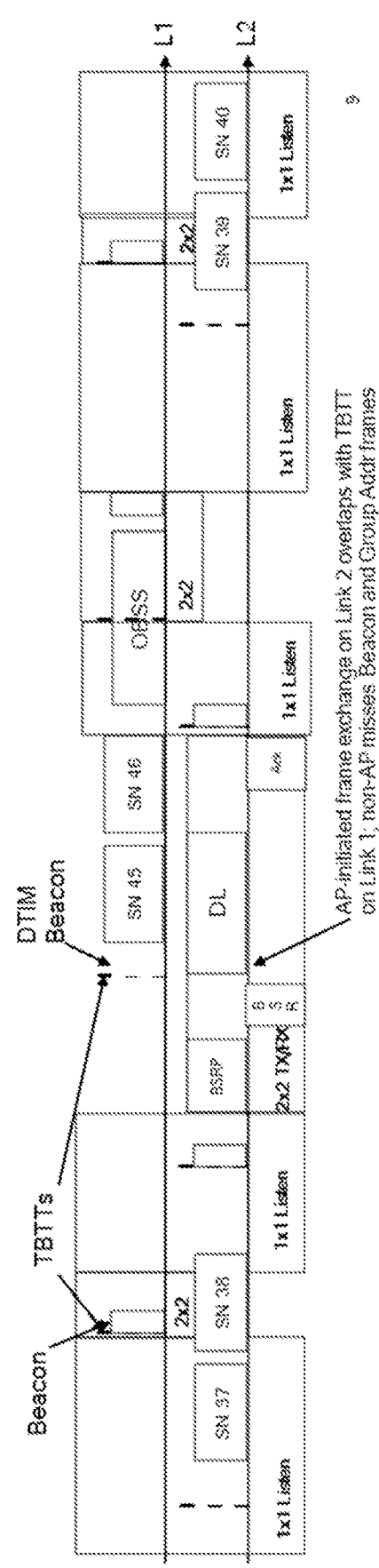
FIG. 9 is an example transmission timeline illustrating a scenario where knowledge of rates of frame transmission for each link may be useful to a non-AP MLD, in accordance with certain aspects of the present disclosure.

FIG. 9 is an example transmission timeline 900 illustrating a scenario where knowledge of rates of frame delivery for each link may be useful to a non-AP MLD, in accordance with certain aspects of the present disclosure. As shown in FIG. 9, on a second link, L2, an AP MLD may initiate a frame exchange sequence by transmitting a BSRP. According to certain aspects described herein, a non-AP MLD receiving the BSRP may choose to participate or decline to engage in the frame exchange sequence with the non-AP MLD. Because the frame exchange sequence is expected to overlap a second TBTT for a first link. L1, in some cases, the non-AP MLD may elect not to participate in the frame exchange sequence on L2 so that the non-AP MLD does not miss receiving group addressed frames (e.g., group addressed frames associated with SN45 and SN46) on L1.

However, in some other cases, where the non-AP MLD has knowledge of a rate of frame delivery on L1 and a rate of frame delivery on L2, the non-AP MLD may determine to engage in the frame exchange sequence on L2 and instead skip receiving the group addressed frames SN45 and SN46 on L1. In particular, the non-AP MLD may determine that skipping receiving group addressed frames SN45 and SN46 on L1 may not affect the performance of the non-AP MLD, for at a later time, the non-AP MLD may switch its anchor link from L1 to L2 to receive group addressed frames SN45 and SN46 on L2. The non-AP MLD may make this determination where the non-AP MLD is aware of SNs for each of L1 and L2 (e.g., the SNs indicating a rate of frame delivery for L1 and L2). Accordingly, in this scenario, the non-AP MLD may not take any action to switch to L1 to receive group addressed frames SN45 and SN46; therefore, no service disruption may be experienced.

Accordingly, in certain aspects, the one or more actions taken by the AP MLD include indicating, to the non-AP MLD, relative rates for group addressed frame delivery on different links. The relative rates for group addressed frame delivery on the different links is used by the non-AP MLD to determine whether receiving the group addressed frame can be skipped (e.g., without affecting the overall performance).

In some cases, the different rates may be indicated via an indication (e.g., in the RNR entry corresponding to the other link) indicating whether (GA deliver rate on) the other link is "faster" or "slower" than the one on which the single bit is advertised. In some cases, the different rates may be indicated via SNs. In particular, the AP MLD may indicate, to the non-AP MLD, the rate of frame delivery for each link by providing a last transmitted SN on each of the links, as well as a ΔSN between the links. For example, in FIG. 9, the DTIM beacon transmitted at the second TBTT on L1 may indicate both (1) an SN equal to 45 for L1 and (2) that a ΔSN of (−7) exists between L1 and L2 as a last in time group addressed frame transmitted by the AP MLD on L2 had an SN of 38 (e.g., ΔSN=SN38−SN45=−7). In some cases, common information in a multi-link (ML) information element (IE) of the beacon may carry information about the last transmitted SN on a current link (e.g., SN45 on L1) while a per-STA profile in the ML IE of the beacon may carry information about the ΔSN between the current link and the other link (e.g., ΔSN of (−7)).

As mentioned previously, not only may the AP MLD take one or more actions to facilitate the reception of group addressed frame(s) at a non-AP MLD given the sing-radio constraint of the non-AP MLD, in certain aspects, the non-AP MLD may alternatively or in addition to actions taken by the AP, take one or more actions to facilitate the reception of group addressed frame(s) at the non-AP MLD.

To improve the reception of the group addressed frame(s) at the non-AP MLD, one or more actions taken by the non-AP may include informing the AP MLD of an anchor link selected by the non-AP MLD. More specifically, the one or more actions taken by the AP MLD may include selecting a first link of the plurality of links as an anchor link and providing an indication of the anchor link to the AP. The AP MLD may use this information to protect group addressed frames transmitted to the non-AP MLD. In particular, because an anchor link of the non-AP MLD is selected by the non-AP MLD to be the first link, the AP MLD may not initiate a frame exchange sequence on the first link and instead initiate a frame exchange sequence on another link of the plurality of links (e.g., based, at least in part, on the indication) so as to not interfere with group addressed frame reception by the non-AP MLD on the first link.

As an illustrative example, the AP MLD may receive an indication from the non-AP MLD that the non-AP MLD has chosen a first link, L1, as its anchor link. Accordingly, when the AP MLD realizes a TBTT on L1 is approaching, the AP MLD may hold off on initiating frame exchange sequences with the non-AP MLD on a second link, L2, and a third link, L3, to ensure that the non-AP MLD in not in a 2×2 TX/RX state on L2 or L3 at a time that overlaps with the TBTT on L1.

In cases where the AP MLD does not have knowledge of the anchor link of the non-AP MLD, the AP MLD may need to protect group addressed frames on all established links between the non-AP MLD and the AP MLD. This may cause additional delay to the system, thereby adversely impacting the overall performance of the system. As an example, in a case where three EMLSR links (e.g., L1, L2, and L3) are established between the non-AP MLD and the AP, the AP MLD may need to keep track of TBTTs approaching on each of these different links to protect group addressed frames on each of these links. Where the AP MLD determines an L1 TBTT is approaching, the AP MLD may determine to hold off on transmitting to the non-AP MLD on L2 and L3, where the AP MLD determines an L2 TBTT is approaching, the AP MLD may determine to hold off on transmissions to the non-AP MLD on L1 and L3, and where the AP MLD determines an L3 TBTT is approaching, the AP MLD may determine to hold off on transmissions to the non-AP MLD on L1 and L2. Accordingly, scheduling at the AP MLD may be difficult to protect group addressed frames on each link where the AP MLD does not know the anchor link of the non-AP MLD. Further, holding off on transmissions on each of links L1, L2, and L3 may cause significant delays to one or more transmissions.

In some cases, the anchor link provided to the AP MLD is a static anchor link selection by the non-AP MLD that is provided during association between the non-AP MLD and the AP MLD. In some cases, the anchor link provided to the AP MLD is a semi-static anchor link selection by the by the non-AP MLD that is initially provided during the association between the non-AP MLD and the AP MLD and subsequently updated transmission of an action frame to the AP MLD. In some cases, the anchor link provided to the AP MLD is a dynamic anchor link selection by the non-AP MLD that is dynamically updated via transmission of a control type frame to the AP MLD.

In certain aspects, an AP MLD may not be capable of protecting group addressed frame reception by the non-AP MLD on all EMLSR links. For example, an AP MLD may be capable of protecting group addressed frame reception where the AP MLD has knowledge of TBTTs on each link where the AP MLD is protecting group addressed frame reception, as well as a good coordination between each of these links. Accordingly, in a loosely-coupled AP-architecture, for example, this may not be the case. Thus the AP MLD may not be capable of protecting group addressed frame reception for the non-AP MLD in this architecture. As another example, the AP MLD may not be capable of protecting group addressed frame reception for the non-AP MLD where a high priority downlink (DL) low latency packet is to be transmitted to the client.

Thus, in such cases, the non-AP MLD may need to take responsibility for protecting group addressed frame reception at the non-AP MLD. In certain aspects, one or more actions taken by the non-AP MLD may include electing to miss a group addressed frame on a first link to receive another group addressed frame on a second link.

As described with respect to FIG. 9 above, in some cases, the non-AP MLD may make this determination based on rate of frame transmissions for each of the first and second link (e.g., indicated by the AP MLD to the non-AP MLD). In certain aspects, one or more actions taken by the non-AP MLD may include electing to miss a group addressed frame on a first link to receive engage in a frame exchange sequence on a second link. In some cases, the non-AP MLD may make this determination based on the scheduled frame exchange sequence on the second link carrying a frame of higher importance (e.g., low-latency packet).

In certain aspects, a frame exchange sequence may be initiated by the non-AP MLD. The non-AP MLD may have knowledge of its anchor link, as well as TBTT(s) on other link(s) established between the non-AP MLD and the AP. Accordingly, the non-AP MLD may be in possession of the necessary information needed to determine whether a frame exchange sequence should be initiated with the AP MLD, or not (e.g., to protect group addressed frame reception on another link). Accordingly, one or more actions taken by the non-AP MLD may include initiating a frame exchange sequence with the AP MLD via a first link, when prior to initiating the frame exchange sequence, the non-AP MLD has determined the frame exchange sequence does not overlap in time with a TBTT on a second link of the plurality of links. Alternatively, where the non-AP MLD determines the frame exchange sequence would overlap in time with a TBTT on a second link of the plurality of links, the non-AP MLD may choose to not initiate a frame exchange sequence with the AP MLD via the first link. The second link may be the anchor link selected by the non-AP MLD.

Figure 10:
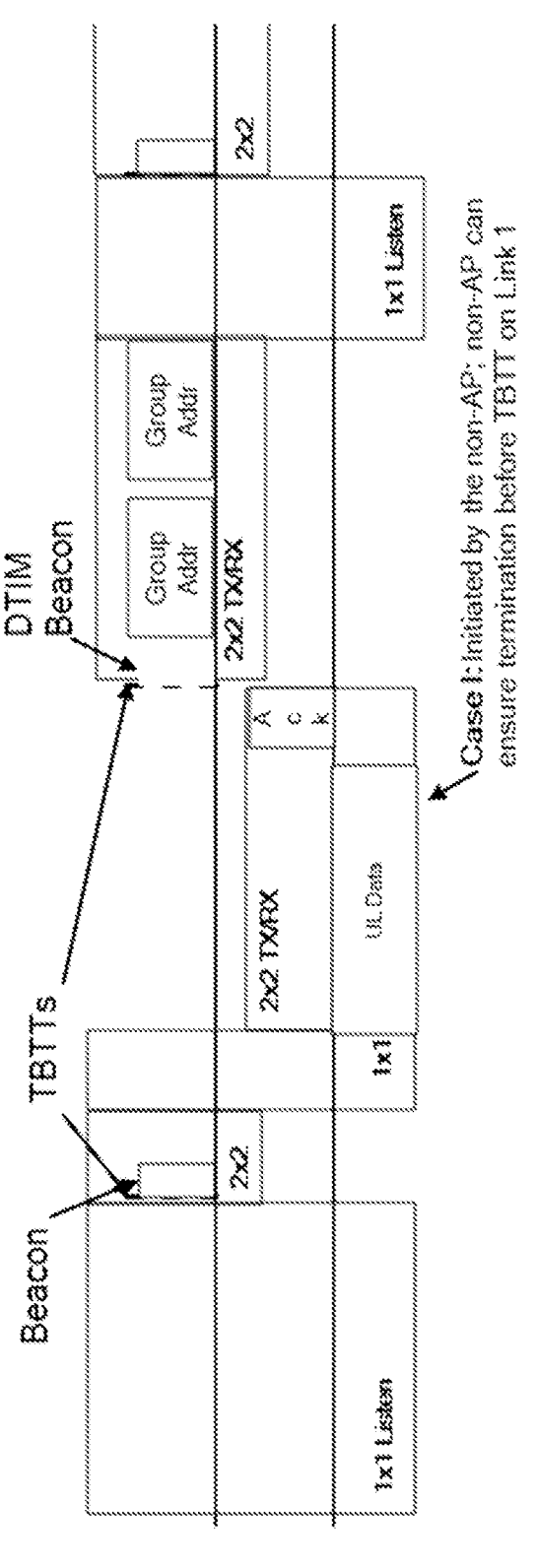
FIG. 10 is an example transmission timeline illustrating a scenario where a frame exchange sequence is initiated by a non-AP MLD, in accordance with certain aspects of the present disclosure.

FIG. 10 is an example transmission timeline 1000 illustrating a scenario where a frame exchange sequence is initiated by a non-AP MLD, in accordance with certain aspects of the present disclosure. As shown in FIG. 10, a non-AP MLD may initiate a frame exchange sequence with an AP MLD on a second link, L2, by transmitting an uplink (UL) data frame. However, prior to transmitting the UL data frame on L2, the non-AP MLD may determine the frame exchange sequence overlaps in time with the a subsequent in time TBTT on a first link, L1. Because the frame exchange sequence on L2 does not overlap in time with the TBTT on L1, the non-AP MLD may initiate the frame exchange sequence. If the non-AP MLD would have determined the frame exchange sequence on L2 would overlap in time with the subsequent in time TBTT on L1, to protect group addressed frame reception on L1, the non-AP MLD may have elected to not initiate the frame exchange sequence on L2.

In certain aspects, a frame exchange sequence may be initiated by the AP, as opposed to the non-AP MLD. To protect group addressed frame reception in cases where frame exchange sequences are initiated by the AP, in certain aspects, one or more actions taken by the non-AP MLD include receiving, from the AP, a control type frame initiating a frame exchange sequence with the non-AP MLD via a first link, and when a time difference between when the control type frame is received and a beginning of a TBTT on a second link is less than a threshold amount of time, determining to ignore the control type frame or respond to the control type frame via signaling indicating an unavailability of the non-AP MLD for the first link.

Figure 11:
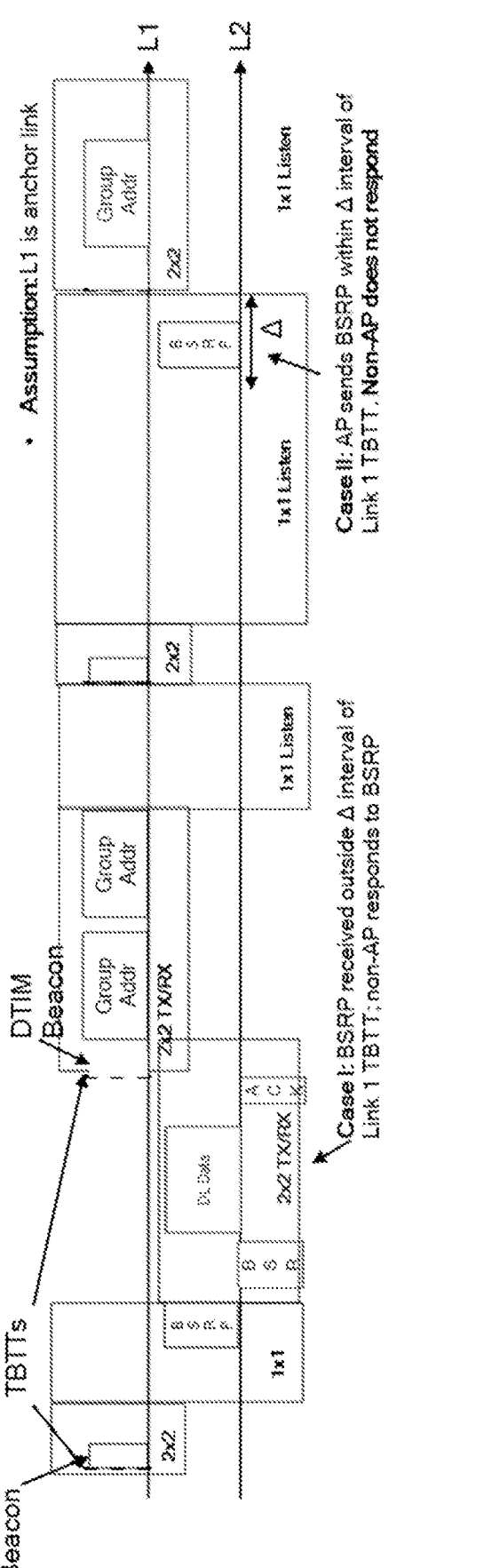
FIG. 11 is an example transmission timeline illustrating a scenario where a non-AP MLD determines to engage in a first frame exchange sequence and ignore a second frame exchange sequence initiated by an AP, in accordance with certain aspects of the present disclosure.

FIG. 11 is an example transmission timeline 1100 illustrating a scenario where a non-AP MLD determines to engage in a first frame exchange sequence and ignore a second frame exchange sequence initiated by an AP, in accordance with certain aspects of the present disclosure. As shown in FIG. 11, during a time between a first and second TBTT on a first link, L1, an AP MLD may initiate a frame exchange sequence with a non-AP MLD (e.g., by transmitting a BSRP) on a second link, L2. The non-AP MLD may have knowledge of an upcoming TBTT on L1 (e.g., the second TBTT on L1) when receiving the BSRP. Prior to responding to the BSRP, the non-AP MLD may determine whether a time difference between when the BSRP is received on L2 and a beginning of the TBTT on L2 is less than a threshold amount of time. In other words, prior to responding to the BSRP, the non-AP MLD may determine whether the BSRP received on L2 is outside a Δ interval on L1. Where the BSRP is outside the Δ interval on L1, the non-AP MLD may respond to the BSRP and engage in the frame exchange sequence. On the other hand, where the BSRP is inside the Δ interval on L1, the non-AP MLD may either (1) ignore the BSRP received on L2 by refraining from responding to the BSRP or (2) respond to the BSRP via signaling indicating an unavailability of the non-AP MLD for L2. In this case (e.g., Case 1 illustrated in FIG. 11), the non-AP MLD may determine the BSRP is received outside the Δ interval on L1 and determine to respond to the BSRP by transmitting a BSR to the AP MLD (and further engage in the exchange of frames with the AP).

As another example illustrated in FIG. 11, during a time between a third and fourth TBTT on L1, the AP MLD may initiate a second frame exchange sequence with the non-AP MLD (e.g., by transmitting a BSRP) on L2. The non-AP MLD may have knowledge of the upcoming fourth TBTT on L1 when receiving the BSRP on L2. Unlike the BSRP received on L2 during a time between a first and second TBTT on L1, the BSRP received on L2 during the time between the third and fourth TBTT on L1 is received within the Δ interval on L1. Accordingly, in Case 2 illustrated in FIG. 11, the non-AP MLD may ignore the BSRP received on L2 by refraining from responding to the BSRP.

As illustrated by the example transmission timeline 1100 of FIG. 11, a Δ interval may be used by a non-AP MLD as a way to determine whether engaging in a frame exchange sequence on one link may cause issues for receiving one or more group addressed frames on another link. For example, a Δ interval for a first link set to 500 usec for first link may be used by a non-AP MLD as a way to determine whether the non-AP MLD should engage in a frame exchange on a second link (e.g., where a control type frame is transmitted to the non-AP MLD on the second link 600 usec prior to a TBTT on the first link) or not engage in the frame exchange on the second link (e.g., where the control type frame is transmitted to the non-AP MLD on the second link 300 usec prior to the TBTT on the first link). In some cases, the non-AP MLD may use the Δ interval for an anchor link to determine whether to engage in a frame exchange sequence on another link when a TBTT on the anchor link is approaching.

As mentioned with respect to FIG. 11, where a control type frame (e.g., BSRP) is received on a second link by the non-AP MLD inside a Δ interval on first link, the non-AP MLD may, in some cases, respond to the control type frame via signaling indicating an unavailability of the non-AP MLD for the second link, as opposed to ignoring the control type frame (as shown in Case II of FIG. 11). The signaling indicating unavailability of the non-AP MLD for the second link may indicate to the AP MLD that the non-AP MLD is unavailable to engage in the transmission and/or reception of subsequent frames on the second link, at the current time.

Figure 12:
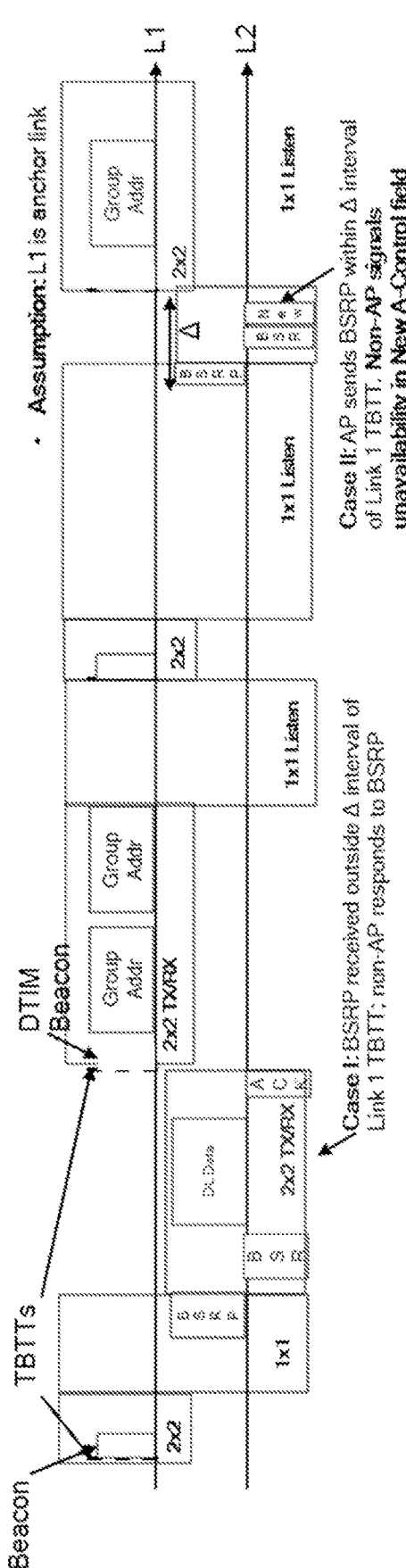
FIG. 12 is an example transmission timeline illustrating a scenario where a non-AP MLD determines to engage in a first frame exchange sequence and signal an unavailability of the non-AP MLD for a second frame exchange sequence initiated by an AP, in accordance with certain aspects of the present disclosure.

FIG. 12 is an example transmission timeline illustrating a scenario where a non-AP MLD determines to engage in a first frame exchange sequence and signal an unavailability of the non-AP MLD for a second frame exchange sequence initiated by an AP, in accordance with certain aspects of the present disclosure. As shown in FIG. 12, similar to FIG. 11, in Case I, the non-AP MLD may determine a BSRP transmitted on the second link, L2, is outside of a Δ interval for a first link, L1; thus, the non-AP may respond to the BSRP by transmitting a BSR. Further, similar to FIG. 11, in Case II, the non-AP MLD may determine a BSRP transmitted on L2 is within a Δ interval for L1. However, unlike FIG. 11, instead of ignoring the BSRP transmitted on L2, the non-AP MLD may respond to the BSRP. The BSRP may respond by signaling, to the AP, an unavailability of the non-AP MLD to transmit and/or receive subsequent frames from the AP MLD on L2 at the current time.

In some cases, the signaling indicating the unavailability of the non-AP MLD for L2 is via a new A-control field of a medium access control (MAC) header in at least one response frame. In cases where the unavailability of the non-AP MLD for the first link is via the new A-control field of the MAC header in the at least one response frame, the at least one response frame includes an aggregate MAC protocol data unit (A-MPDU). A first MPDU of the response frame may indicate a BSR in the BSRP Control of the A-Control field of the MAC header where the control type frame received from the AP MLD is a BSRP and a second MPDU of the response frame may indicate the unavailability of the non-AP MLD via the new A-control field of the MAC header.

In some cases, the signaling indicating the unavailability of the non-AP MLD for L2 is via a power management (PM) bit of a frame control field of the MAC header in the response frame.

In some cases, the at least one response frame includes one or more Quality of Service (QoS) Null frames. In some cases, the at least one response frame comprises a QoS Null frame with a QoS control field that indicates the BSR and a subfield (e.g., a new A-Control field) that indicates the unavailability.

In a case where only one QoS Null frame is sent, the BSR from the non-AP MLD is indicated in a QoS Control field and the unavailability is signaled in an A-Control field.

In some cases, signaling an unavailability of the non-AP MLD to transmit and/or receive subsequent frames on one link may implicitly indicate an anchor link of the non-AP MLD. For example, a non-AP MLD may signal an unavailability on one link to receive group addressed frames on another link. Thus, when the AP MLD receives the unavailability signaling from the non-AP MLD for one or more links (e.g., depending on the number of EMLSR links established between the non-AP MLD and the AP), the AP MLD may be able to determine which link is the anchor link of the non-AP MLD.

In certain aspects, the one or more actions taken by the non-AP MLD to protect group addressed frame reception by the non-AP MLD may include terminating DL transmissions from the AP MLD on one link when a TBTT on another link is approaching. More specifically, one or more actions taken by the non-AP MLD includes receiving, from the AP, a control type frame initiating a frame exchange sequence with the non-AP MLD via a first link, wherein the frame exchange sequence is for communication of one or more DL or UL frames and when a time difference between when the control type frame is received and a beginning of a TBTT on a second link is more than a first threshold amount of time, engaging in the frame exchange sequence.

When engaging in the frame exchange sequence, the non-AP MLD may determine, prior to sending a last UL frame of the frame exchange sequence, that a beginning of the TBTT for the second link is occurring in a second threshold amount of time and transmitting the last UL frame having an A-control field or a PM bit indicating an unavailability of the non-AP MLD based, at least in part, on determination. The unavailability of the non-AP MLD indicated in the UL frame may trigger a termination of the frame exchange sequence. In some cases, the last UL frame is a UL data frame. In some cases, the last UL frame is a UL control frame.

Figure 13:
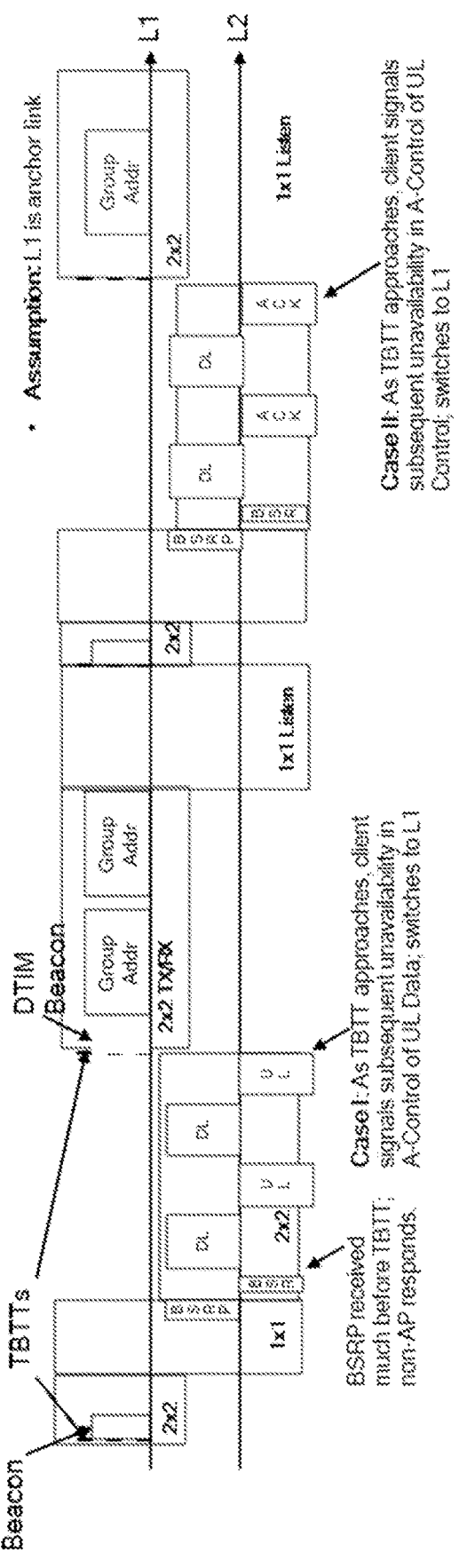
FIG. 13 is an example transmission timeline illustrating a scenario where uplink (UL) frames are transmitted by a non-AP MLD to terminate frame exchange sequences on an enhanced multi-link single radio (EMLSR) link, in accordance with certain aspects of the present disclosure.

FIG. 13 is an example transmission timeline 1300 illustrating a scenario where UL frames are transmitted by a non-AP MLD to terminate frame exchange sequences on an EMLSR link, in accordance with certain aspects of the present disclosure. Two cases are illustrated in example transmission timeline 1300 of FIG. 13: Case I where a UL data frame is transmitted by the non-AP MLD to trigger termination of the frame exchange sequence and Case II where a UL control frame is transmitted by the non-AP MLD to trigger termination of the frame exchange sequence.

As illustrated in FIG. 13, for both Case I and Case II, a control type frame initiating a frame exchange sequence with the non-AP MLD is received by the non-AP MLD on a second link, L2. Each of the control type frames is a BSRP used to initiate the communication of one or more DL and UL frames between the non-AP MLD and the AP MLD. Because the BSRP in each case is received a sufficient amount of time prior to a TBTT on a first link, L1 (e.g., a time difference between the BSRP in Case I and the second TBTT on L1 is more than a first threshold amount of time and a time difference between the BSRP in Case II and the second TBTT on L1 is more than a first threshold amount of time), the non-AP MLD engages in the frame exchange sequence with the AP MLD (e.g., by transmitting a BSR in Case I and Case II).

In both cases, after the transmission of UL and DL frames between the AP MLD and the non-AP MLD, the non-AP MLD may determine the TBTT on link 1 and the TBTT on link 2 is approaching (e.g., is approaching in a second threshold amount of time). Accordingly, the non-AP MLD transmits in its last UL frame an unavailability of the non-AP MLD to receive and/or transmit any subsequent frames. In Case I, the non-AP MLD signals the unavailability in a UL data frame. In case II, the non-AP MLD signals the unavailability in a UL control frame. The last UL frame may have an A-control field or a PM bit indicating the unavailability of the non-AP MLD. Transmitting the last UL frame having an A-control field or a PM bit indicating an unavailability of the non-AP triggers a termination of the frame exchange sequence between the non-AP MLD and the AP. Alternatively, in cases where the non-AP MLD does not respond indicting the unavailability of the non-AP MLD, AP may continue to retransmit the frames/double its contention window (CW) due to the non-AP MLD's lack of response.

After the transmission of the UL frame signaling the unavailability of the non-AP MLD, the non-AP MLD may switch to a 2×2 TX/RX state on L1 for receiving group addressed frames. By terminating the frame exchange sequence based on an approaching TBTT, the non-AP MLD facilitates the reception of group addressed frame(s) at the non-AP MLD.

In certain aspects, the one or more actions taken by the non-AP MLD to protect group addressed frame reception by the non-AP MLD may include transmitting an unsolicited frame explicitly indicating an unavailability of the non-AP MLD. More specifically, one or more actions taken by the non-AP MLD includes determining that a beginning of a TBTT configured by the AP MLD for a first link of the plurality of links is occurring in a threshold amount of time and transmitting, to the AP MLD, an unsolicited frame explicitly indicating an unavailability of the non-AP MLD for a second link of the plurality of links, wherein the unavailability indicated in the unsolicited frame indicates to the AP MLD to refrain from initiating a frame exchange with the non-AP MLD on the second link. In certain aspects, the unavailability explicitly indicated by the non-AP MLD is indicated via a PM bit of the unsolicited frame. In certain aspects, the unsolicited frame is a QoS Null frame.

Figure 14:
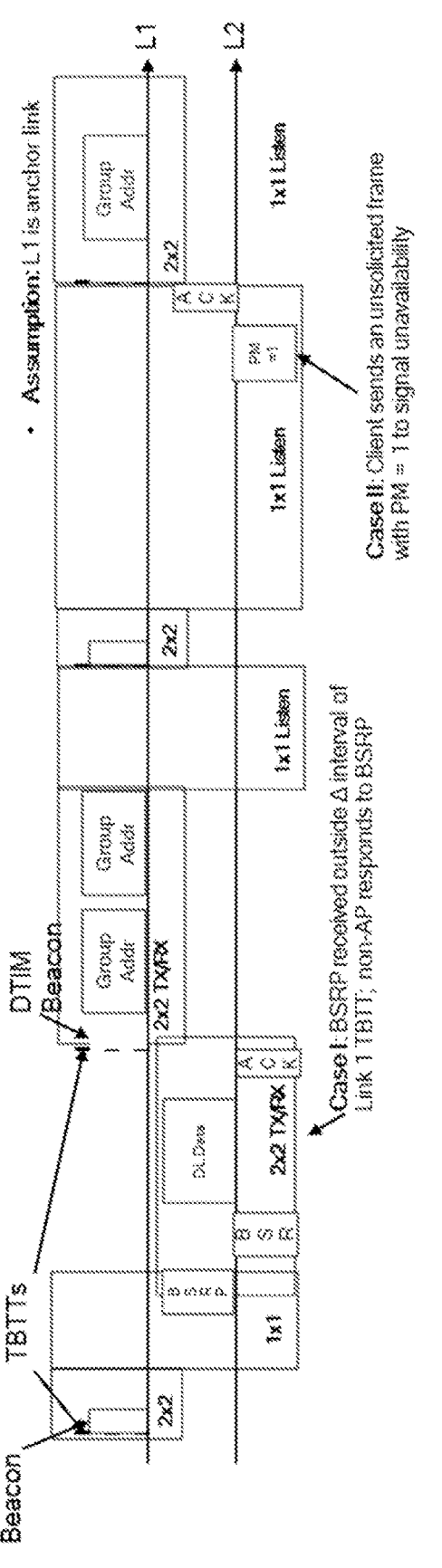
FIG. 14 is an example transmission timeline illustrating a scenario where an unsolicited frame is transmitted by a non-AP MLD to indicate an unavailability of the non-AP MLD one an EMLSR link, in accordance with certain aspects of the present disclosure.

FIG. 14 is an example transmission timeline 1400 illustrating a scenario where an unsolicited frame is transmitted by a non-AP MLD to indicate an unavailability of the non-AP MLD one an EMLSR link, in accordance with certain aspects of the present disclosure. As illustrated in Case II of FIG. 14, an unsolicited frame (e.g., a frame not asked for by the AP) may be transmitted voluntarily to the AP on a second link, L2, to explicitly indicate to the AP that the non-AP MLD may be unavailable for a frame exchange on L2. The non-AP MLD may transmit the unsolicited frame before a TBTT on a first link, L1, to ensure that the non-AP MLD is able to receive one or more group addressed frames on L1.

Example Operations

Figure 15:
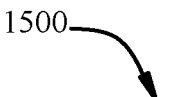
FIG. 15 is a flow diagram illustrating example operations for wireless communications by an AP MLD, in accordance with certain aspects of the present disclosure.

FIG. 15 is a flow diagram illustrating example operations 1500 for wireless communications, in accordance with certain aspects of the present disclosure. Operations 1500 may be performed, for example, by a wireless node, such as an AP MLD (such as AP MLD 402 illustrated in FIG. 4).

Operations 1500 begin, at 1505, by the AP MLD establishing a plurality of links for communication with a non-AP MLD, wherein one or more non-AP MLDs, including the non-AP MLD, communicate with the AP on each link of the plurality of links.

At 1510, the AP MLD takes one or more actions designed to ensure that the non-AP MLD is able to receive a group addressed frame.

FIG. 16 is a flow diagram illustrating example operations 1600 for wireless communications, in accordance with certain aspects of the present disclosure. Operations 1600 may be performed, for example, by a wireless node, such as a non-AP MLD such as non-AP MLD 404 illustrated in FIG. 4). The non-AP MLD may be operating in an EMLSR mode. Operations 1600 may be complementary operations by the non-AP MLD to the operations 1500 performed by the AP MLD.

Operations 1600 begin, at 1605, by the non-AP MLD operating in the EMLSR mode, establishing a plurality of links for communication with an AP MLD, wherein one or more non-AP MLDs, including the non-AP MLD, communicate with the AP on each link of the plurality of links.

At 1610, the non-AP operating in the EMLSR mode, takes one or more actions designed to ensure that the non-AP MLD is able to receive a group addressed frame.

The various operations of methods described above may be performed by any suitable means capable of performing the corresponding functions. The means may include various hardware or software component(s) or module(s), including, but not limited to a circuit, an application specific integrated circuit (ASIC), or processor. Generally, where there are operations illustrated in figures, those operations may have corresponding counterpart means-plus-function components with similar numbering.

Example Devices

FIG. 17 illustrates a communications device 1700 that may include various components (such as corresponding to means-plus-function components) operable, configured, or adapted to perform the techniques disclosed herein, such as the operations illustrated in FIG. 15. In some examples, communications device 1700 may be an AP MLD, such as AP MLD 402 illustrated in FIG. 4.

Communications device 1700 includes a processing system 1702 coupled to a transceiver 1708 (such as a transmitter or a receiver). Transceiver 1708 is configured to transmit and receive signals for the communications device 1700 via an antenna 1710, such as the various signals as described herein. Processing system 1702 may be configured to perform processing functions for the communications device 1700, including processing signals received or to be transmitted by the communications device 1700.

Processing system 1702 includes a processor 1704 coupled to a computer-readable medium/memory 1712 via a bus 1706. In certain aspects, computer-readable medium/memory 1712 is configured to store instructions (such as computer-executable code) that when executed by processor 1704, cause processor 1704 to perform the operations illustrated in FIG. 15, or other operations for performing the various techniques discussed herein for MLOs.

In certain aspects, computer-readable medium/memory 1712 stores code 1714 (such as an example of means for) for establishing and code 1716 (such as an example of means for) for taking one or more actions.

In certain aspects, processor 1704 has circuitry configured to implement the code stored in the computer-readable medium/memory 1712. Processor 1704 includes circuitry 1724 (such as an example of means for) for establishing and circuitry 1726 (such as an example of means for) for taking one or more actions.

Transceiver 1708 may provide a means for receiving information such as packets, user data, or control information associated with various information channels (such as control channels, data channels, etc.). Information may be passed on to other components of the device 1700. Transceiver 1708 may be an example of aspects of the transceiver 254 described with reference to FIG. 2. Antenna 1710 may correspond to a single antenna or a set of antennas. Transceiver 1708 may provide means for transmitting signals generated by other components of the device 1700.

For example, means for transmitting (or means for outputting for transmission) may include a transmitter (such as the transmitter unit 222) or an antenna(s) 224 of AP 110 or the transmitter unit 254 or antenna(s) 252 of the STA 120 illustrated in FIG. 2. Means for receiving (or means for obtaining) may include a receiver (such as the receiver unit 222) or an antenna(s) 224 of AP 110 or the receiver unit 254 or antenna(s) 252 of STA 120 illustrated in FIG. 2. Means for communicating may include a transmitter, a receiver or both. Means for establishing and means for taking one or more actions may include a processing system, which may include one or more processors, such as the RX data processor 242, the TX data processor 210, the TX spatial processor 220, or the controller 230 of AP 110 or the RX data processor 270, the TX data processor 288, the TX spatial processor 290, or the controller 280 of STA 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception. In some cases, the interface to output a frame for transmission and the interface to obtain a frame (which may be referred to as first and second interfaces herein) may be the same interface.

FIG. 18 illustrates a communications device 1800 that may include various components (such as corresponding to means-plus-function components) operable, configured, or adapted to perform operations for the techniques disclosed herein, such as the operations illustrated in FIG. 16. In some examples, communications device 1800 may be a non-AP MLD, such as non-AP MLD 404 illustrated in FIG. 4.

Communications device 1800 includes a processing system 1802 coupled to a transceiver 1808 (such as a transmitter or a receiver). Transceiver 1808 is configured to transmit and receive signals for the communications device 1800 via an antenna 1810, such as the various signals as described herein. Processing system 1802 may be configured to perform processing functions for the communications device 1800, including processing signals received or to be transmitted by the communications device 1800.

Processing system 1802 includes a processor 1804 coupled to a computer-readable medium/memory 1812 via a bus 1806. In certain aspects, computer-readable medium/ memory 1812 is configured to store instructions (such as computer-executable code) that when executed by processor 1804, cause processor 1804 to perform the operations illustrated in FIG. 16, or other operations for performing the various techniques discussed herein for MLOs.

In certain aspects, computer-readable medium/memory 1812 stores code 1814 (such as an example of means for) for establishing and code 1816 (such as an example of means for) for taking one or more actions.

In certain aspects, processor 1804 has circuitry configured to implement the code stored in the computer-readable medium/memory 1812. Processor 1804 includes circuitry 1824 (such as an example of means for) for establishing and circuitry 1826 (such as an example of means for) for taking one or more actions.

Transceiver 1808 may provide a means for receiving information such as packets, user data, or control information associated with various information channels (such as control channels, data channels, etc.). Information may be passed on to other components of the device 1800. Transceiver 1808 may be an example of aspects of the transceiver 254 described with reference to FIG. 2. Antenna 1810 may correspond to a single antenna or a set of antennas. Transceiver 1808 may provide means for transmitting signals generated by other components of the device 1800.

For example, means for transmitting (or means for outputting for transmission) may include a transmitter (such as the transmitter unit 222) or an antenna(s) 224 of AP 110 or the transmitter unit 254 or antenna(s) 252 of the STA 120 illustrated in FIG. 2. Means for receiving (or means for obtaining) may include a receiver (such as the receiver unit 222) or an antenna(s) 224 of AP 110 or the receiver unit 254 or antenna(s) 252 of STA 120 illustrated in FIG. 2. Means for communicating may include a transmitter, a receiver or both. Means for establishing and means for taking one or more actions may include a processing system, which may include one or more processors, such as the RX data processor 242, the TX data processor 210, the TX spatial processor 220, or the controller 230 of AP 110 or the RX data processor 270, the TX data processor 288, the TX spatial processor 290, or the controller 280 of STA 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception. In some cases, the interface to output a frame for transmission and the interface to obtain a frame (which may be referred to as first and second interfaces herein) may be the same interface.

Example Aspects

Aspect 1: A method for wireless communication by an access point (AP) multi-link device (MLD), comprising: establishing a plurality of links for communication with a non-AP MLD, wherein one or more non-AP MLDs, including the non-AP MLD, communicate with the AP on each link of the plurality of links; and taking one or more actions designed to ensure that the non-AP MLD is able to receive a group addressed frame.

Aspect 2: The method of Aspect 1, wherein the non-AP MLD is operating in an enhanced multi-link single radio (EMLSR) mode.

Aspect 3: The method of Aspect 1 or 2, wherein the one or more actions comprise: transmitting a trigger frame preceding transmission of the group addressed frame, the trigger frame indicating to the non-AP MLD to enter into a full capability state for receiving the group addressed frame via a first link of the plurality of links.

Aspect 4: The method of Aspect 3, wherein the trigger frame comprises: a first control type frame, wherein the first control type frame comprises a buffer status report poll (BSRP) or a multiple user (MU)-request to send (RTS) (MU-RTS); or a second control type frame used to indicate to all non-AP MLDs operating in an enhanced multi-link single radio (EMLSR) mode in communication with the AP, including the non-AP MLD, to each enter into a full capability state for receiving the group addressed frame via the first link.

Aspect 5: The method of any of Aspects 1-4, wherein the one or more actions comprise: buffering the group addressed frame until a pre-determined time to allow the non-AP MLD to enter into a full capability state for receiving the group addressed frame via a first link of the plurality of links; and transmitting the group addressed frame via the first link at the pre-determined time.

Aspect 6: The method of Aspect 5, wherein the pre-determined time comprises a time after a transmission of a delivery traffic indication message (DTIM) beacon during a target beacon transmission time (TBTT) interval configured by the AP MLD for the first link.

Aspect 7: The method of any of Aspects 1-6, wherein the one or more actions comprise: initiating a frame exchange sequence on a first link of the plurality of links by transmitting a control type frame to the non-AP MLD via the first link, wherein prior to initiating the frame exchange sequence the AP MLD determines: a second link of the plurality of links is an anchor link selected by the non-AP MLD; and the frame exchange sequence does not overlap in time with a group addressed frame transmission on the second link.

Aspect 8: The method of any of Aspects 1-7, wherein the one or more actions comprise: determining a first period for a first link of the plurality of links does not overlap in time with a second period for a second link of the plurality of links, wherein the first period is used for transmitting a DTIM beacon and a group addressed frame to the non-AP MLD via the first link and the second period is used for transmitting a DTIM beacon and a group addressed frame to the non-AP MLD via the second link; and refraining from scheduling a frame exchange with the non-AP MLD via: the second link during the first period, or the first link during the second period.

Aspect 9: The method of Aspect 8, wherein when refraining from scheduling the frame exchange with the non-AP MLD, the AP MLD schedules at least one other frame exchange with at least one of: a non-AP MLD that is not operating in an EMLSR mode; or a non-AP station (STA).

Aspect 10: The method of any of Aspects 1-9, wherein the one or more actions comprise: determining a first period for a first link of the plurality of links does, at least partially, overlap in time with a second period for a second link of the plurality of links, wherein the first period is used for transmitting a DTIM beacon and a group addressed frame to the non-AP MLD via the first link and the second period is used for transmitting a DTIM beacon and a group addressed frame to the non-AP MLD via the second link; determining a duration of the first period is longer than a duration of the second period; and refraining from scheduling a frame exchange with the non-AP MLD via the second link during a portion of the first period that does not overlap in time with the second period.

Aspect 11: The method of Aspect 10, wherein when refraining from scheduling the frame exchange with the non-AP MLD via the second link during the portion of the first period that does not overlap in time with the second period, the AP MLD schedules at least one other frame exchange with at least one of: a non-AP MLD not operating in an EMLSR mode; or a non-AP station (STA).

Aspect 12: The method of any of Aspects 1-11, wherein the one or more actions comprise indicating, to the non-AP MLD, relative rates for group addressed frame delivery on different links.

Aspect 13: The method of any of Aspects 1-12, wherein, when an anchor link associated with the non-AP MLD is not known by the AP MLD, the one or more actions comprise: determining a TBTT period configured by-AP MLD for each link of the plurality of links; determining a first link of the plurality of links with the determined TBTT period beginning first in time among each of the determined TBTT periods for each of the links; and delaying scheduling a frame exchange with the non-AP MLD via each link of the plurality of links, excluding the first link.

Aspect 14: A method for wireless communication by a non-access point (non-AP) multi-link device (MLD) operating in an enhanced multi-link single radio (EMLSR) mode, comprising: establishing a plurality of links for communication with an AP MLD, wherein one or more non-AP MLDs, including the non-AP MLD, communicate with the AP on each link of the plurality of links; and taking one or more actions designed to ensure that the non-AP MLD is able to receive a group addressed frame.

Aspect 15: The method of Aspect 14, wherein the group addressed frame comprises, at least one of: a first bit indicating to the non-AP MLD that a subsequent group addressed frame is to be transmitted by the AP MLD; or a second bit indicating to the non-AP MLD that no additional group addressed frames are to be transmitted by the AP MLD, wherein the second bit triggers the non-AP MLD to switch from a full capability state to a listening state.

Aspect 16: The method of Aspect 14 or 15, wherein the one or more actions comprise: selecting a first link of the plurality of links as an anchor link; and providing an indication of the anchor link to the AP MLD, wherein the AP MLD initiates a frame exchange sequence on another link of the plurality of links based, at least in part, on the indication.

Aspect 17: The method of Aspect 16, wherein the indication of the anchor link provided to the AP comprises, an indication of at least one of: a static anchor link selection by the non-AP MLD that is provided during association between the non-AP MLD and the AP; a semi-static anchor link selection by the by the non-AP MLD that is initially provided during the association between the non-AP MLD and the AP and subsequently updated transmission of an action frame to the AP; or a dynamic anchor link selection by the non-AP MLD that is dynamically updated via transmission of a control type frame to the AP.

Aspect 18: The method of any of Aspects 15-17, wherein the one or more actions comprise: electing to miss another group addressed frame to receive the group addressed frame, wherein the other group addressed frame is transmitted on a first link of the plurality of links and the group addressed frame is transmitted on a second link of the plurality of links.

Aspect 19: The method of Aspect 18, wherein electing to miss the other group addressed frame to receive the group addressed frame is based, at least in part, on an indication, from the AP MLD, of relative rates for group addressed frame delivery on different links.

Aspect 20: The method of Aspect 18 or 19, wherein electing to miss the other group addressed frame to receive the group addressed frame is based, at least in part, on a priority of one or more frames of a scheduled frame exchange sequence.

Aspect 21: The method of any of Aspects 14-20, wherein the one or more actions comprise: initiating a frame exchange sequence with the AP MLD via a first link of the plurality of links, wherein prior to initiating the frame exchange sequence the non-AP MLD determines the frame exchange sequence does not overlap in time with a group addressed frame transmission configured for the non-AP MLD on a second link of the plurality of links, wherein the second link comprises an anchor link selected by the non-AP MLD.

Aspect 22: The method of any of Aspects 14-21, wherein the one or more actions comprise: receiving, from the AP MLD, a control type frame initiating a frame exchange with the non-AP MLD via a first link of the plurality of links; and when a time difference between when the control type frame is received and a beginning of a TBTT configured by the AP MLD on a second link of the plurality of links is less than a threshold amount of time, determining to: ignore the control type frame; or respond to the control type frame via signaling indicating an unavailability of the non-AP MLD for the first link.

Aspect 23: The method of Aspect 22, wherein the signaling indicating the unavailability of the non-AP MLD for the first link is via: a new A-control field of a medium access control (MAC) header in at least one response frame; or a power management (PM) bit of a frame control field of the MAC header in the response frame.

Aspect 24: The method of Aspect 23, wherein when the unavailability of the non-AP MLD for the first link is via the new A-control field of the MAC header in the at least one response frame, the at least one response frame comprising an aggregate MAC protocol data unit (A-MPDU), wherein: a first MPDU of the response frame indicates a buffer status report (BSR) where the control type frame received from the AP MLD is a buffer status report poll (BSRP); and a second MPDU of the response frame indicates the unavailability via the new A-control field.

Aspect 25: The method of Aspect 24, wherein when the at least one response frame comprises one or more Quality of Service (QoS) Null frames.

Aspect 26: The method of Aspect 25, wherein the at least one response frame comprises a QoS Null frame with: a QoS control field that indicates the BSR; and a subfield that indicates the unavailability.

Aspect 27: The method of any of Aspects 14-26, wherein the one or more actions comprise: receiving, from the AP MLD, a control type frame initiating a frame exchange sequence with the non-AP MLD via a first link of the plurality of links, wherein the frame exchange sequence is for communication of one or more downlink (DL) and uplink (UL) frames; and when a time difference between when the control type frame is received and a beginning of a TBTT configured by the AP MLD on a second link of the plurality of links is more than a first threshold amount of time, engaging in the frame exchange sequence, wherein engaging in the frame exchange sequence comprises: determining, prior to sending a last UL frame of the frame exchange sequence, that a beginning of the TBTT configured by the AP MLD on the second link is occurring in a second threshold amount of time; and transmitting the last UL frame having an A-control field or a PM bit indicating an unavailability of the non-AP MLD based, at least in part, on the determining, wherein the unavailability triggers a termination of the frame exchange sequence.

Aspect 28: The method of Aspect 27, wherein the last UL frame is a UL data frame or a UL control frame.

Aspect 29: The method of any of Aspects 14-28, wherein the one or more actions comprise: determining that a beginning of a TBTT configured by the AP MLD on a first link of the plurality of links is occurring in a threshold amount of time; and transmitting, to the AP MLD, an unsolicited frame explicitly indicating an unavailability of the non-AP MLD for a second link of the plurality of links, wherein the unavailability indicated in the unsolicited frame indicates to the AP MLD to refrain from initiating a frame exchange with the non-AP MLD on the second link.

Aspect 30: The method of Aspect 29, wherein the unavailability explicitly indicated is indicated via a PM bit of the unsolicited frame.

Aspect 31: The method of Aspect 29 or 30, wherein the unsolicited frame is a QoS Null frame.

Aspect 32: An apparatus including means for performing the method of any of Aspects 1 through 31.

Aspect 33. An apparatus including at least one processor and a memory coupled to the at least one processor, the memory and the at least one processor being configured to perform the method of any of Aspects 1 through 31.

Aspect 34. A computer readable medium storing computer executable code thereon for wireless communications that, when executed by at least one processor, cause an apparatus to perform the method of any of Aspects 1 through 31.

Additional Considerations

As used herein, the term "determining" encompasses a wide variety of actions. For example, "determining" may include calculating, computing, processing, deriving, investigating, looking up (such as looking up in a table, a database or another data structure), ascertaining and the like. Also, "determining" may include receiving (such as receiving information), accessing (such as accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

The invention claimed is:

1. A method for wireless communication by an access point (AP) multi-link device (MLD), comprising:
establishing a plurality of links for communication with a non-AP MLD, wherein the non-AP MLD communicates with the AP MLD on one or more links of the plurality of links, and wherein the non-AP MLD is operating in an enhanced multi-link single radio (EMLSR) mode; and
taking one or more actions designed to ensure that the non-AP MLD is able to receive a group addressed frame, wherein the one or more actions comprise:
buffering the group addressed frame until a pre-determined time based, at least in part, on the non-AP MLD operating in the EMLSR mode.

2. The method of claim 1, wherein the one or more actions further comprise:
transmitting a trigger frame preceding transmission of the group addressed frame, the trigger frame indicating to the non-AP MLD to enter into a full capability state for receiving the group addressed frame via a first link of the plurality of links.

3. The method of claim 2, wherein the trigger frame comprises:
a first control type frame, wherein the first control type frame comprises a buffer status report poll (BSRP) or a multiple user (MU)-request to send (RTS) (MU-RTS); or
a second control type frame used to indicate to all non-AP MLDs operating in the EMLSR mode in communication with the AP MLD, including the non-AP MLD, to each enter into the full capability state for receiving the group addressed frame via the first link.

4. The method of claim 1, wherein the one or more actions further comprise:
transmitting the group addressed frame via a first link at the pre-determined time.

5. The method of claim 4, wherein the pre-determined time comprises a time after a transmission of a delivery traffic indication message (DTIM) beacon during a target beacon transmission time (TBTT) interval configured by the AP MLD for the first link.

6. The method of claim 1, wherein the one or more actions further comprise:

initiating a frame exchange sequence on a first link of the plurality of links by transmitting a control type frame to the non-AP MLD via the first link, wherein prior to initiating the frame exchange sequence the AP MLD determines:

a second link of the plurality of links is an anchor link selected by the non-AP MLD; and the frame exchange sequence does not overlap in time with a group addressed frame transmission on the second link.

7. The method of claim 1, wherein the one or more actions further comprise:

determining a first period for a first link of the plurality of links does not overlap in time with a second period for a second link of the plurality of links, wherein the first period is used for transmitting a delivery traffic indication message (DTIM) beacon and the group addressed frame to the non-AP MLD via the first link and the second period is used for transmitting a DTIM beacon and a group addressed frame to the non-AP MLD via the second link; and refraining from scheduling a frame exchange with the non-AP MLD via:

the second link during the first period, or the first link during the second period.

8. The method of claim 7, wherein when refraining from scheduling the frame exchange with the non-AP MLD, the AP MLD schedules at least one other frame exchange with at least one of:

a non-AP MLD that is not operating in an EMLSR mode; or a non-AP station (STA).

9. The method of claim 1, wherein the one or more actions further comprise:

determining a first period for a first link of the plurality of links does, at least partially, overlap in time with a second period for a second link of the plurality of links, wherein the first period is used for transmitting a delivery traffic indication message (DTIM) beacon and the group addressed frame to the non-AP MLD via the first link and the second period is used for transmitting a DTIM beacon and a group addressed frame to the non-AP MLD via the second link;

determining a duration of the first period is longer than a duration of the second period; and refraining from scheduling a frame exchange with the non-AP MLD via the second link during a portion of the first period that does not overlap in time with the second period.

10. The method of claim 9, wherein when refraining from scheduling the frame exchange with the non-AP MLD via the second link during the portion of the first period that does not overlap in time with the second period, the AP MLD schedules at least one other frame exchange with at least one of:

a non-AP MLD not operating in an EMLSR mode; or a non-AP station (STA).

11. The method of claim 1, wherein the one or more actions further comprise indicating, to the non-AP MLD, relative rates for group addressed frame delivery on different links.

12. The method of claim 1, wherein, when an anchor link associated with the non-AP MLD is not known by the AP MLD, the one or more actions further comprise:

determining a target beacon transmission time (TBTT) period configured by the non-AP MLD for each link of the plurality of links;

determining a first link of the plurality of links with the determined TBTT period beginning first in time among each of the determined TBTT periods for each of the links; and delaying scheduling a frame exchange with the non-AP MLD via each link of the plurality of links, excluding the first link.

13. A method for wireless communication by a multi-link device (MLD) operating in an enhanced multi-link single radio (EMLSR) mode, comprising:

establishing a plurality of links for communication with an AP MLD, wherein the MLD communicates with the AP MLD on two or more links of the plurality of links; and taking one or more actions designed to ensure that the MLD is able to receive a group addressed frame, wherein the one or more actions comprise:

receiving, from the AP MLD, a control type frame initiating a frame exchange with the MLD via a first link of the plurality of links; and when the frame exchange overlaps with the group addressed frame, determining to:

ignore the control type frame.

14. The method of claim 13, wherein the group addressed frame comprises, at least one of:

a first bit indicating to the MLD that a subsequent group addressed frame is to be transmitted by the AP MLD; or a second bit indicating to the MLD that no additional group addressed frames are to be transmitted by the AP MLD, wherein the second bit triggers the MLD to switch from a full capability state to a listening state.

15. The method of claim 13, wherein the one or more actions further comprise:

selecting the first link of the plurality of links as an anchor link; and providing an indication of the anchor link to the AP MLD, wherein the AP MLD initiates a frame exchange sequence on another link of the plurality of links based, at least in part, on the indication.

16. The method of claim 15, wherein the indication of the anchor link provided to the AP MLD comprises, an indication of at least one of:

a static anchor link selection by the MLD that is provided during association between the MLD and the AP MLD;

a semi-static anchor link selection by the MLD that is initially provided during the association between the MLD and the AP MLD and subsequently updated transmission of an action frame to the AP MLD; or a dynamic anchor link selection by the MLD that is dynamically updated via transmission of a control type frame to the AP MLD.

17. The method of claim 13, wherein the one or more actions further comprise:

electing to miss another group addressed frame to receive the group addressed frame, wherein the other group addressed frame is transmitted on the first link of the plurality of links and the group addressed frame is transmitted on a second link of the plurality of links.

18. The method of claim 17, wherein electing to miss the other group addressed frame to receive the group addressed frame is based, at least in part, on an indication, from the AP MLD, of relative rates for group addressed frame delivery on different links.

19. The method of claim 17, wherein electing to miss the other group addressed frame to receive the group addressed frame is based, at least in part, on a priority of one or more frames of a scheduled frame exchange sequence.

20. The method of claim 13, wherein the one or more actions further comprise:

initiating a frame exchange sequence with the AP MLD via the first link of the plurality of links, wherein prior to initiating the frame exchange sequence the MLD determines the frame exchange sequence does not overlap in time with a group addressed frame transmission configured for the MLD on a second link of the plurality of links, wherein the second link comprises an anchor link selected by the MLD.

21. The method of claim 13, wherein the one or more actions further comprise:

receiving, from the AP MLD, the control type frame initiating a frame exchange sequence with the MLD via the first link of the plurality of links, wherein the frame exchange sequence is for communication of one or more downlink (DL) and uplink (UL) frames; and when a time difference between when the control type frame is received and a beginning of a target beacon transmission time (TBTT) configured by the AP MLD on a second link of the plurality of links is more than a first threshold amount of time, engaging in the frame exchange sequence, wherein engaging in the frame exchange sequence comprises:

determining, prior to sending a last UL frame of the frame exchange sequence, that the beginning the TBTT configured by the AP MLD on the second link is occurring in a second threshold amount of time; and transmitting the last UL frame having an A-control field or a power management (PM) bit indicating an unavailability of the MLD based, at least in part, on the determining, wherein the unavailability triggers a termination of the frame exchange sequence.

22. The method of claim 21, wherein the last UL frame is a UL data frame or a UL control frame.

23. The method of claim 13, wherein the one or more actions further comprise:

determining that a beginning of a target beacon transmission time (TBTT) configured by the AP MLD on the first link of the plurality of links is occurring in a threshold amount of time; and transmitting, to the AP MLD, an unsolicited frame explicitly indicating an unavailability of the MLD for a second link of the plurality of links, wherein the unavailability indicated in the unsolicited frame indicates to the AP MLD to refrain from initiating the frame exchange with the MLD on the second link.

24. The method of claim 23, wherein the unavailability explicitly indicated is indicated via a power management (PM) bit of the unsolicited frame.

25. The method of claim 23, wherein the unsolicited frame is a quality of service (QoS) Null frame.

26. An access point (AP) multi-link device (MLD), comprising:

memory; and one or more processors coupled to the memory, the one or more processors, individually or collectively, being configured to:

establish a plurality of links for communication with a non-AP MLD, wherein the non-AP MLD communicates with the AP MLD on one or more links of the plurality of links, and wherein the non-AP MLD is operating in an enhanced multi-link single radio (EMLSR) mode; and take one or more actions designed to ensure that the non-AP MLD is able to receive a group addressed frame, wherein the one or more actions comprise the one or more processors and the memory being configured to:

buffer the group addressed frame until a pre-determined time based, at least in part, on the non-AP MLD operating in the EMLSR mode.

27. A multi-link device (MLD) operating in an enhanced multi-link single radio (EMLSR) mode, comprising:

memory; and one or more processors coupled to the memory, the one or more processors, individually or collectively, being configured to:

establish a plurality of links for communication with an AP MLD, wherein the MLD communicates with the AP MLD on two or more links of the plurality of links; and take one or more actions designed to ensure that the MLD is able to receive a group addressed frame, wherein the one or more actions comprise the one or more processors and the memory being configured to:

receive, from the AP MLD, a control type frame initiating a frame exchange with the MLD via a first link of the plurality of links; and when the frame exchange overlaps with the group addressed frame, determine to:

ignore the control type frame.

* * * * *